US012684251B2

(12) United States Patent
Wen et al.

(10) Patent No.: US 12,684,251 B2
(45) Date of Patent: Jul. 14, 2026

(54) IMAGE CAPTURE METHOD, IMAGE DISPLAY METHOD, AND APPARATUS

(71) Applicant: HUAWEI TECHNOLOGIES CO., LTD., Shenzhen (CN)

(72) Inventors: Jinsong Wen, Shenzhen (CN); Shuncai Zhong, Shenzhen (CN); Weiwei Xu, Hangzhou (CN); Qiyan Zhai, Shenzhen (CN); Wenhong Gong, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 18/731,364

(22) Filed: Jun. 3, 2024

(65) Prior Publication Data

US 2024/0323544 A1 Sep. 26, 2024

Related U.S. Application Data

(63) Continuation of application No. PCT/CN2023/072023, filed on Jan. 13, 2023.

(30) Foreign Application Priority Data

Jan. 18, 2022 (CN) .......................... 202210056484.6
Oct. 24, 2022 (CN) .......................... 202211302042.1

(51) Int. Cl.
H04N 23/76 (2023.01)
G09G 5/10 (2006.01)
H04N 23/71 (2023.01)

(52) U.S. Cl.
CPC .............. H04N 23/76 (2023.01); G09G 5/10 (2013.01); H04N 23/71 (2023.01); G09G 2320/0233 (2013.01)

(58) Field of Classification Search
CPC ...... H04N 19/186; H04N 23/76; H04N 19/46; H04N 19/85; H04N 23/71; H04N 1/60; G09G 5/10; G09G 2320/0233
See application file for complete search history.

(56) References Cited

U.S. PATENT DOCUMENTS 9,374,589 B2 * 6/2016 Ten ........................... G06T 5/50
2017/0201667 A1 * 7/2017 Chang .................. H04N 23/741

FOREIGN PATENT DOCUMENTS

CN          110741623 A      1/2020
EP          2819414 A2 *   12/2014   ............. H04N 19/85
EP          3618422 A1 *    3/2020   ........... H04N 23/611

OTHER PUBLICATIONS

Greg Ward et al "JPEG-HDR", International Conference on Computer Graphics and Interactive Techniques, ACM Siggraph 2006 papers, Boston, MA, ACM, New York, NY, USA, Jul. 30, 2006 (Jul. 30, 2006), DOI: 10.1145/1185657.1185685, ISBN: 978-1-59593-364-5 (Year: 2006).*

(Continued)

*Primary Examiner* — Lin Ye
*Assistant Examiner* — Steven Daniel Barry

(57) ABSTRACT

An image capture method, an image display method, and an apparatus are provided to reduce a difference between an image displayed on a display end and an image displayed on a capture end. During encoding, the capture end transmits data for describing a luminance mapping relationship between a before-compression image and an after-compression image to the display end, so that consistency between the image on the capture end and the image on the display end is ensured as much as possible. In addition, screen related information for describing luminance of the capture end is transmitted to the display end, so that the display end adjusts backlight and a pixel value based on the screen (Continued)

related information, to improve consistency between the image on the capture end and the image on the display end.

18 Claims, 10 Drawing Sheets

(56)                    References Cited

OTHER PUBLICATIONS

Greg Ward et al,"JPEG-HDR: A Backwards-Compatible, High Dynamic Range Extension to JPEG", International Conference on Computer Graphics and Interactive Techniques,ACM Siggraph 2006 Paper, Jul. 30, 2006,XP058118842,total 8 pages.

* cited by examiner

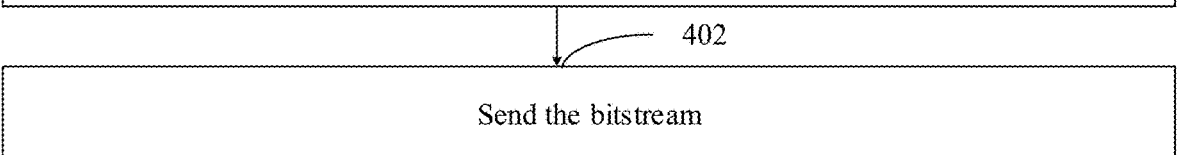

401

Encode image data of a second image and first luminance related data into a bitstream, where the bitstream includes a joint photographic experts group (JPEG) file, the JPEG file carries the image data of the second image and the first luminance related data, the image data of the second image is obtained by compressing image data of a first image, a quantity of bits occupied by the first image is greater than a quantity of bits occupied by the second image, and the first luminance related data is used to represent a luminance mapping relationship between the first image and the second image

402

Send the bitstream

FIG. 4

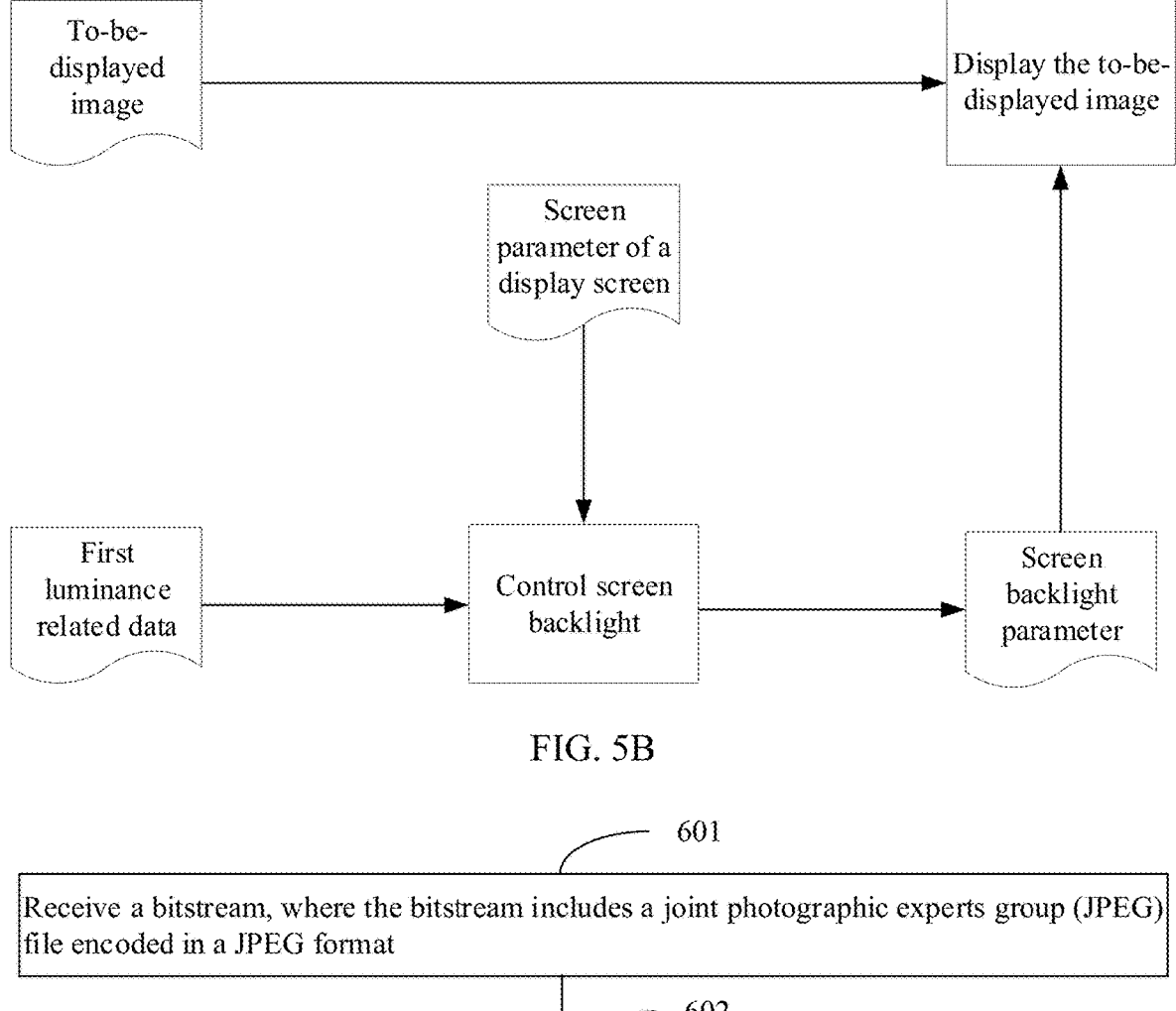

Receive a bitstream, where the bitstream includes a joint photographic experts group (JPEG) file encoded in a JPEG format

602

Decode the JPEG file to obtain image data of a second image and first luminance related data, where the image data of the second image is obtained by compressing image data of a first image, a quantity of bits occupied by the first image is greater than a quantity of bits occupied by the second image, the first luminance related data is used to represent a luminance mapping relationship between the first image and the second image, and the first luminance related data is used to perform enhancement on the image data of the second image

FIG. 6

IMAGE CAPTURE METHOD, IMAGE DISPLAY METHOD, AND APPARATUS

CROSS-REFERENCE TO RELATED APPLICATIONS

This application is a continuation of International Patent Application No. PCT/CN2023/072023, filed on Jan. 13, 2023, which claims priorities to Chinese Patent Application No. 202210056484.6, filed on Jan. 18, 2022, and Chinese Patent Application No. 202211302042.1, filed on Oct. 24, 2022. All of the aforementioned patent applications are hereby incorporated by reference in their entireties.

TECHNICAL FIELD

This application relates to the field of image processing technologies, and in particular, to an image capture method, an image display method, and an apparatus.

BACKGROUND

An existing terminal device, for example, a mobile phone or a tablet, compresses and encodes image data without considering other device information after completing image capture. A display end automatically adjusts screen luminance as ambient light changes, and data to be displayed remains unchanged regardless of the luminance. Display effect on the display end may differ greatly from that on a capture end.

SUMMARY

Embodiments of this application provide an image capture method, an image display method, and an apparatus, to reduce a difference between an image displayed on a display end and an image displayed on a capture end.

According to a first aspect, an embodiment of this application provides an image capture method, applied to a capture end device and including: capturing a first image to obtain image data of the first image; performing compression on the first image based on the image data of the first image to obtain image data of a second image, where a quantity of bits of the first image is greater than a quantity of bits of the second image; obtaining transmission data of the second image based on the image data of the first image and the image data of the second image, where the transmission data of the second image includes encoded data of the second image and first luminance related data, and the first luminance related data is used to represent a luminance mapping relationship between the first image and the second image; and sending the transmission data of the second image.

In the current solution, when the capture end device performs photographing, although a large number of highlighted details are retained, a relative light-dark relationship of a real scene is not completely recorded, and the relative light-dark relationship is weakened. However, in this embodiment of this application, details of a photographed image are transmitted to a display end device by using the first luminance related data. Further, the display end device may adjust a pixel value of the received image based on the first luminance related data to obtain a to-be-displayed image, so that the to-be-displayed image is more similar to the image captured by the capture end device.

According to a second aspect, an embodiment of this application provides an image display method, applied to a display end device and including: receiving transmission data of a second image, where the transmission data of the second image includes encoded data of the second image and first luminance related data, the first luminance related data is used to represent a luminance mapping relationship between the second image and a first image, a quantity of bits of the first image is greater than a quantity of bits of the second image, and the second image is an image obtained by compressing the first image; determining a first tone mapping curve; performing tone mapping on the second image based on the first tone mapping curve to obtain a third image; and adjusting a pixel value of a pixel of the third image based on the luminance related data to obtain a to-be-displayed image.

According to a third aspect, an embodiment of this application provides an image capture apparatus, applied to a capture end device and including:

a capture module, configured to capture a first image to obtain image data of the first image;

a processing module, configured to: perform compression on the first image based on the image data of the first image to obtain image data of a second image, where a quantity of bits of the first image is greater than a quantity of bits of the second image; and obtain transmission data of the second image based on the image data of the first image and the image data of the second image, where the transmission data of the second image includes encoded data of the second image and first luminance related data, and the first luminance related data is used to represent a luminance mapping relationship between the first image and the second image; and a sending module, configured to send the transmission data.

According to a fourth aspect, an embodiment of this application provides an image display apparatus, applied to a display end device and including:

a decoding module, configured to: receive transmission data of a second image, where the transmission data of the second image includes encoded data of the second image and first luminance related data, the first luminance related data is used to represent a luminance mapping relationship between the second image and a first image, a quantity of bits of the first image is greater than a quantity of bits of the second image, and the second image is an image obtained by compressing the first image; and determine a first tone mapping curve; and a processing module, configured to: perform tone mapping on the second image based on the first tone mapping curve to obtain a third image; and adjust a pixel value of a pixel of the third image based on the luminance related data to obtain a to-be-displayed image.

According to a fifth aspect, an embodiment of this application provides an image encoding method, applied to an encoding apparatus and including: encoding image data of a second image and first luminance related data into a bitstream, where the bitstream includes a joint photographic experts group (JPEG) file, the JPEG file carries the image data of the second image and the first luminance related data, the image data of the second image is obtained by compressing image data of a first image, a quantity of bits of the first image is greater than a quantity of bits of the second image, and the first luminance related data is used to represent a luminance mapping relationship between the first image and the second image; and sending the bitstream.

According to a sixth aspect, an embodiment of this application provides an image decoding method. For specific effect, refer to the related description of the fifth aspect. Details are not described herein again. The method includes: receiving a bitstream, where the bitstream includes a joint photographic experts group (JPEG) file encoded in a JPEG format; and decoding the JPEG file to obtain image data of a second image and first luminance related data, where the image data of the second image is obtained by compressing image data of a first image, a quantity of bits of the first image is greater than a quantity of bits of the second image, and the first luminance related data is used to represent a luminance mapping relationship between the first image and the second image. The first luminance related data is used to perform enhancement on the image data of the second image.

According to a seventh aspect, an embodiment of this application provides an encoding apparatus, including:

an encoding module, configured to encode image data of a second image and first luminance related data into a bitstream, where the bitstream includes a joint photographic experts group (JPEG) file, the JPEG file carries the image data of the second image and the first luminance related data, the image data of the second image is obtained by compressing image data of a first image, a quantity of bits of the first image is greater than a quantity of bits of the second image, and the first luminance related data is used to represent a luminance mapping relationship between the first image and the second image; and a sending module, configured to send the bitstream.

According to an eighth aspect, an embodiment of this application provides a decoding apparatus, including:

a receiving module, configured to receive a bitstream, where the bitstream includes a joint photographic experts group (JPEG) file encoded in a JPEG format; and a decoding module, configured to decode the JPEG file to obtain image data of a second image and first luminance related data.

The image data of the second image is obtained by compressing image data of a first image, a quantity of bits of the first image is greater than a quantity of bits of the second image, and the first luminance related data is used to represent a luminance mapping relationship between the first image and the second image. The first luminance related data is used to perform enhancement on the image data of the second image.

According to a ninth aspect, an embodiment of this application provides a capture end device, configured to implement the method according to the first aspect or the fifth aspect.

According to a tenth aspect, an embodiment of this application provides a capture end device, including a non-volatile memory and a processor that are coupled to each other. The processor invokes program code stored in the memory to perform the method according to any one of the first aspect or the designs of the first aspect, or perform the method according to any one of the fifth aspect or the designs of the fifth aspect. The capture end device may further include a sensor, configured to capture an image.

According to an eleventh aspect, an embodiment of this application provides a display end device, configured to implement the method according to the second aspect or the sixth aspect.

According to a twelfth aspect, an embodiment of this application provides a display end device, including a nonvolatile memory and a processor that are coupled to each other. The processor invokes program code stored in the memory to perform the method according to any one of the second aspect or the designs of the second aspect, or perform the method according to any one of the sixth aspect or the designs of the sixth aspect.

According to a thirteenth aspect, an embodiment of this application provides an image processing system, including the capture end device according to the fifth aspect or the sixth aspect and the display end device according to the eleventh aspect or the twelfth aspect.

According to a fourteenth aspect, an embodiment of this application provides a computer-readable storage medium. The computer-readable storage medium stores program code. The program code includes instructions for performing some or all steps of any method in the first aspect, instructions for performing some or all steps of any method in the second aspect, instructions for performing some or all steps of any method in the fifth aspect, or instructions for performing some or all steps of any method in the sixth aspect.

According to a fifteenth aspect, an embodiment of this application provides a computer program product. When the computer program product runs on a computer, the computer is enabled to perform some or all steps of any method in the first aspect, the computer is enabled to perform some or all steps of any method in the second aspect, the computer is enabled to perform some or all steps of any method in the fifth aspect, or the computer is enabled to perform some or all steps of any method in the sixth aspect.

It should be understood that for beneficial effects of the third to fifteenth aspects of this application, refer to the related descriptions of the first aspect to the second aspect. Details are not described again.

In this application, based on the implementations provided in the foregoing aspects, the implementations may be further combined to provide more implementations.

BRIEF DESCRIPTION OF DRAWINGS

To describe the technical solutions in embodiments of this application more clearly, the following briefly describes the accompanying drawings for describing embodiments.

FIG. 4 is a schematic flowchart of an image encoding method according to an embodiment of this application;

FIG. 5B is a schematic flowchart of adjusting screen backlight of a display end device according to an embodiment of this application;

FIG. 6 is a schematic flowchart of an image decoding method according to an embodiment of this application;

US 12,684,251 B2

5

Figure 9:
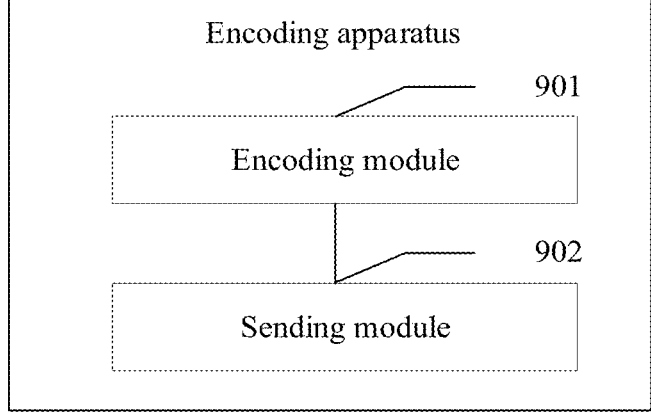
Figure 10:
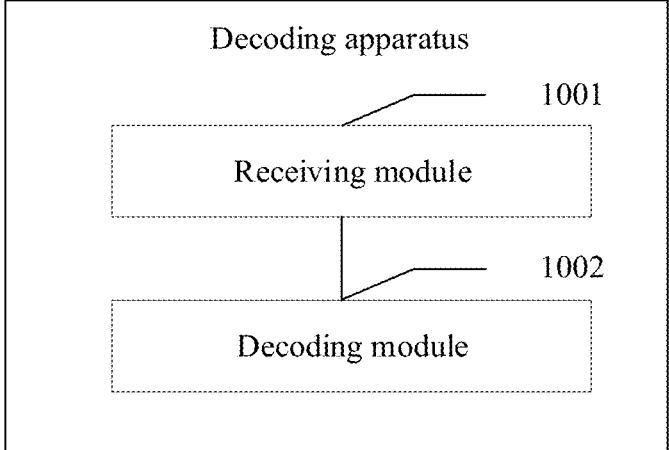
Figure 11:
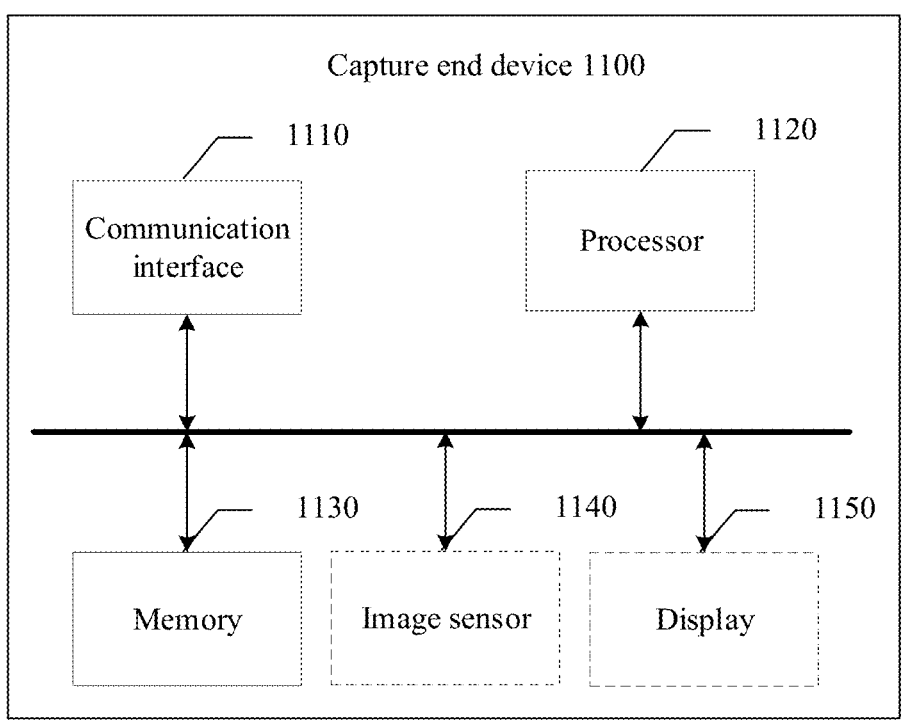
Figure 12:
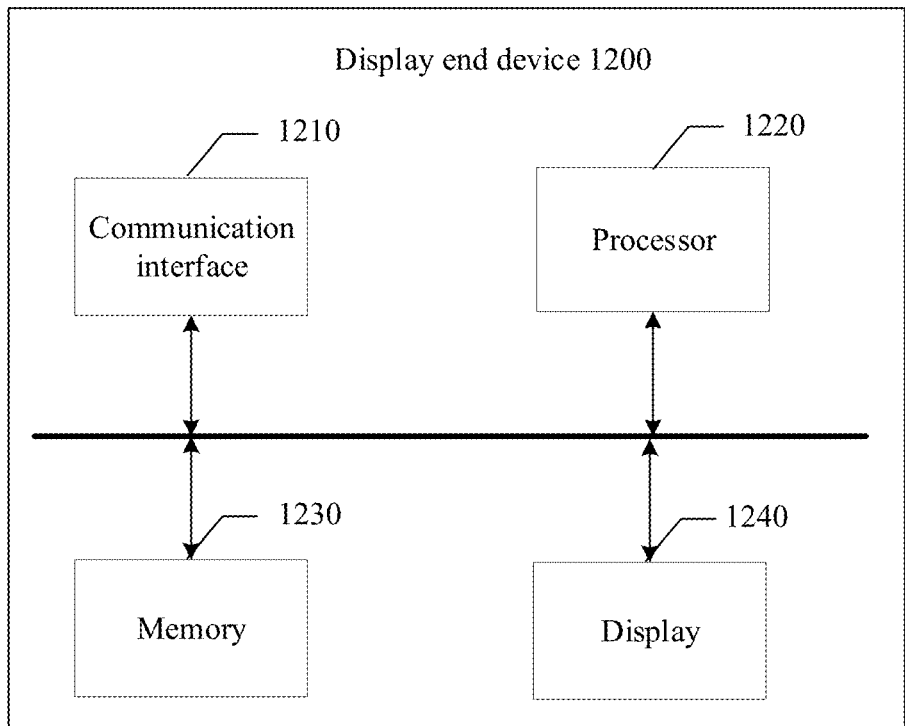

FIG. 9 is a diagram of an encoding apparatus according to an embodiment of this application;

FIG. 10 is a diagram of a decoding apparatus according to an embodiment of this application;

FIG. 11 is a diagram of a structure of a capture end device according to an embodiment of this application; and FIG. 12 is a diagram of a structure of a display end device according to an embodiment of this application.

DESCRIPTION OF EMBODIMENTS

In embodiments of the specification, claims, and accompanying drawings of this application, the terms "first", "second", and the like are intended to distinguish between similar objects but do not necessarily indicate a specific order or sequence. In addition, the terms "include", "have", and any variant thereof are intended to cover non-exclusive inclusion, for example, include a series of steps or units. For example, a process, method, system, product, or device that includes a series of steps or units is not necessarily limited to those steps or units expressly listed, but may include other steps or units not expressly listed or inherent to such a process, method, system, product, or device.

It should be understood that, in this application, "at least one" means one or more, and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. "At least one item (piece) of the following" or a similar expression thereof means any combination of these items, including a singular item (piece) or any combination of plural items (pieces). For example, at least one (piece) of a, b, or c may represent: a, b, c, "a and b", "a and c", "b and c", or "a, b, and c", where a, b, and c may be singular or plural.

To facilitate understanding of the technical solutions in embodiments of this application, related technical terms and physical concepts are first described.

(1) A pixel is a basic unit of an image. A color of a pixel is usually described by using several (for example, three) relatively independent attributes. These independent attributes are combined to naturally form a spatial coordinate, that is, a color space. In embodiments of this application, an independent attribute of a pixel is referred to as a color component of each pixel or a pixel value of each pixel, for example, an R component, a G component, a B component, or a Y component.

(2) Metadata (metadata) records key information of an image in a video, a scene, or a frame. Static metadata (static metadata) is unchanged metadata in a sequence. Dynamic metadata (dynamic metadata) is metadata that changes with an image or a scene.

(3) A quantity of bits of an image is a quantity of bits of colors of an image that can be displayed. For example, if each color R, G, or B is represented by one byte (8 bits), each image may have 16.7 million colors. If each color R, G, or B is represented by two bytes (16 bits), each image may have the 12th power of 10 of colors. For a grayscale image, if each pixel is represented by one byte (8 bits), an image may have 256 grayscale levels, and if each pixel is represented by two bytes (16 bits), an image may have 65536 grayscale levels.

(4) A content adaptive backlight technology (content adaptive backlight control, CABC) is a conventional backlight adjustment technology that controls global backlight based on a display environment and display content to reduce power consumption, and is currently mainly applied to a mobile device, for example, a mobile phone.

In an edge-lit local dimming (edge-lit local dimming) technology, all backlight sources of a display are located at an edge that is of the display and that faces the center of the display. Edge backlight is divided into a plurality of areas, and backlight dimming control is performed on these areas of the display. A larger quantity of the divided areas indicates finer backlight control of the display.

In a full-array local dimming (full-array local dimming) technology, a series of separate display backlight areas are generally used behind a display panel to light up the display, instead of any type of sidelight backlight. Each display backlight area is independently controlled, the display is divided into many separate "areas", and local dimming is performed on each small area. For image content that appears on the display at a time, different quantities of bright areas and dark areas may be roughly divided, and local dimming is performed based on different luminance degrees in each area, so that contrast is improved. A larger quantity and a smaller size of the divided areas indicate better dimming control and higher contrast of display content on the display.

(5) Histogram information is a histogram for indicating luminance distribution in a digital image, and depicts a quantity of pixels of each luminance value in the image. How to adjust luminance distribution may be learned of from the histogram. In the histogram, the left side of the abscissa is a pure black and dark area, and the right side is a bright and pure white area. Therefore, histogram data of a dark image is mostly concentrated on the left side and in the middle. On the contrary, histogram data of a bright image with only a few shadows is mostly concentrated on the right side.

(6) Backlight luminance is luminance of a display light source in this application. Backlight luminance usually is luminance of a light source for a backlit display (for example, an LCD), while a self-illumination display usually does not use the term "backlight". For ease of description, "backlight luminance" in this application includes self-illumination luminance of the self-illumination display.

A screen backlight parameter is maximum luminance displayed on the screen or maximum display luminance supported by the screen, for example, 600 nits. The screen backlight parameter may be maximum display luminance of the entire screen, or different areas may correspond to the same maximum display luminance.

(7) Tone mapping curve:

A capture end device generates, by using an optical signal of a natural scene, a picture or a video that includes the natural scene. To facilitate image or video transmission, the optical signal needs to be converted into an electrical signal, and image information of each pixel is recorded by using a luminance value or a chrominance value (for example, a grayscale value from 0 to 255) in a fixed value range. A curve of converting an optical signal into an electrical signal is an optical electro transfer function. The common optical electro transfer function includes a PQ (perceptual quantizer) optical electro transfer function, an HLG (hybrid log-gamma) optical electro transfer function, and a scene luminance fidelity (scene luminance fidelity, SLF) optical electro transfer function. A display device may reproduce the natural scene by displaying the picture or the video. The display device may determine, based on the optical electro transfer function and a luminance value or a grayscale value of each pixel in the image, luminance that is of an object and that exists during photographing, that is, an electronic device may convert YUV or RGB information into luminance in a unit of nit. However, luminance of the object may exceed a display capability of the display device. Because luminance information obtained by the capture end device does not match a luminance display capability of the display device, the following cases exist: A display device with a low luminance display capability displays a high-luminance image, and a display device with a high luminance display capability displays a low-luminance image. In these cases, tone mapping (tone mapping) needs to be performed on the image obtained by the capture end device, so that the image conforms to the display capability of the display device. For example, tone mapping may be performed on a high dynamic range image based on a tone mapping curve, to display the image on a display device with a low dynamic range display capability.

(8) Metadata (metadata) is used to describe key information or features required in a video or image processing process. Static metadata (static metadata) is metadata that remains unchanged in a video. Dynamic metadata (dynamic metadata) is metadata that changes with a video or an image.

(9) Description method of bitstream syntax:

The description method of bitstream syntax is similar to C language. Syntax elements of a bitstream are represented in bold, and each syntax element is described by using a name. (English letter groups separated by underscores, all letters are lowercase), syntax, and semantics. Values of the syntax elements in a syntax table and a body are represented in regular fonts.

In some cases, other variable values derived from the syntax elements may be applied to the syntax table. These variables are named in underlined lowercase letters in the syntax table or the body, or a combination of lowercase and uppercase letters. Variables starting with uppercase letters are used to decode current and related syntax structures, and can also be used to decode subsequent syntax structures. Variables starting with lowercase letters are used only in a section in which the variables are located.

Relationships between mnemonics of syntax element values and variable values and these values are described in the body. In some cases, the syntax element values and the variable values are equivalently used.

If a length of a bit string is an integer multiple of 4, the bit string may be represented by a hexadecimal symbol. A hexadecimal prefix is "0x". For example, "0x1a" indicates a bit string "0001 1010".

In a conditional statement, 0 indicates FALSE, and non-0 indicates TRUE.

The syntax table describes a superset of all bitstream syntaxes conforming to this document, with additional syntax restrictions described in the relevant sections.

Figure 1A:
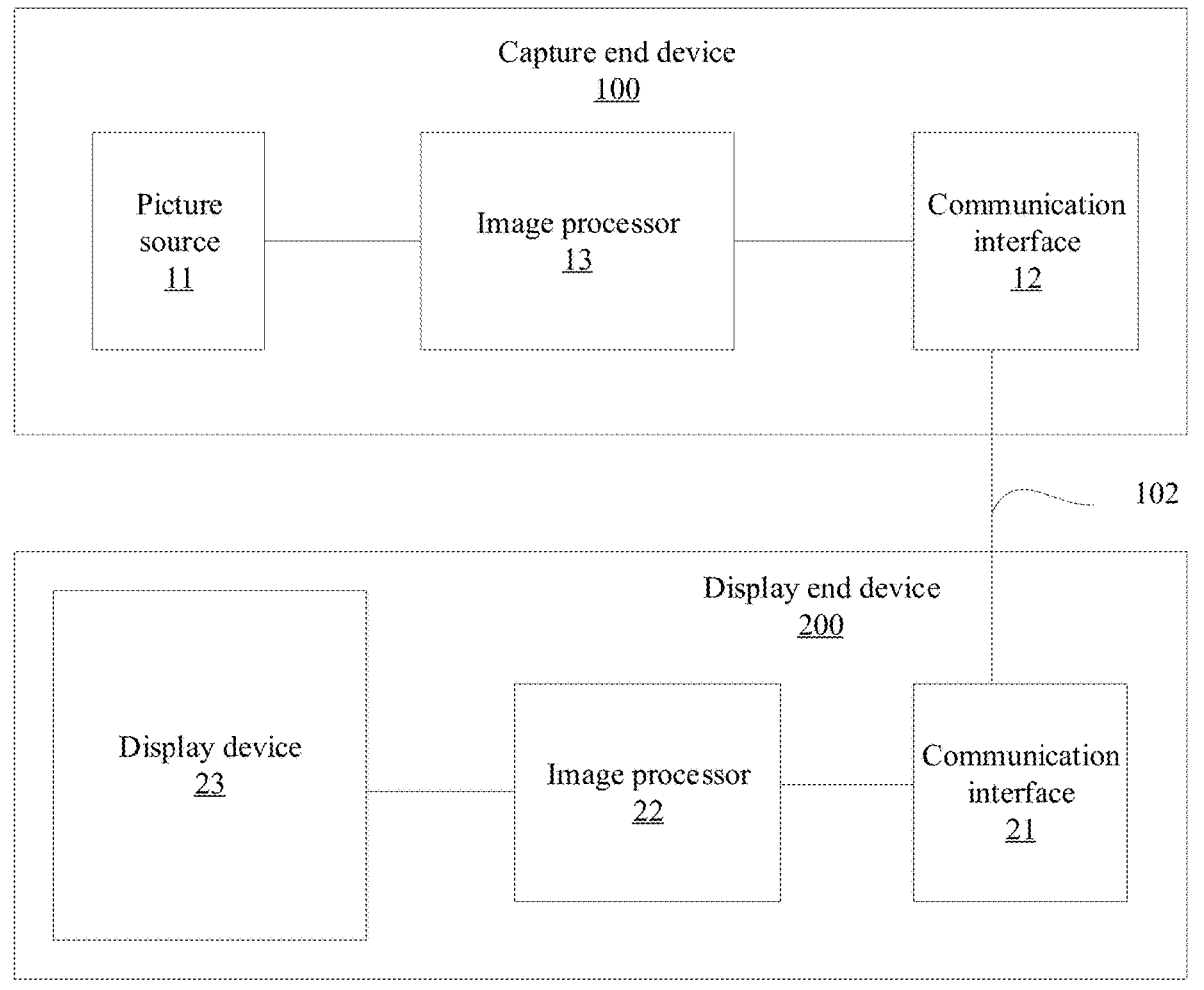
FIG. 1A is a block diagram of an image display system according to an embodiment of this application.
Figure 1B:
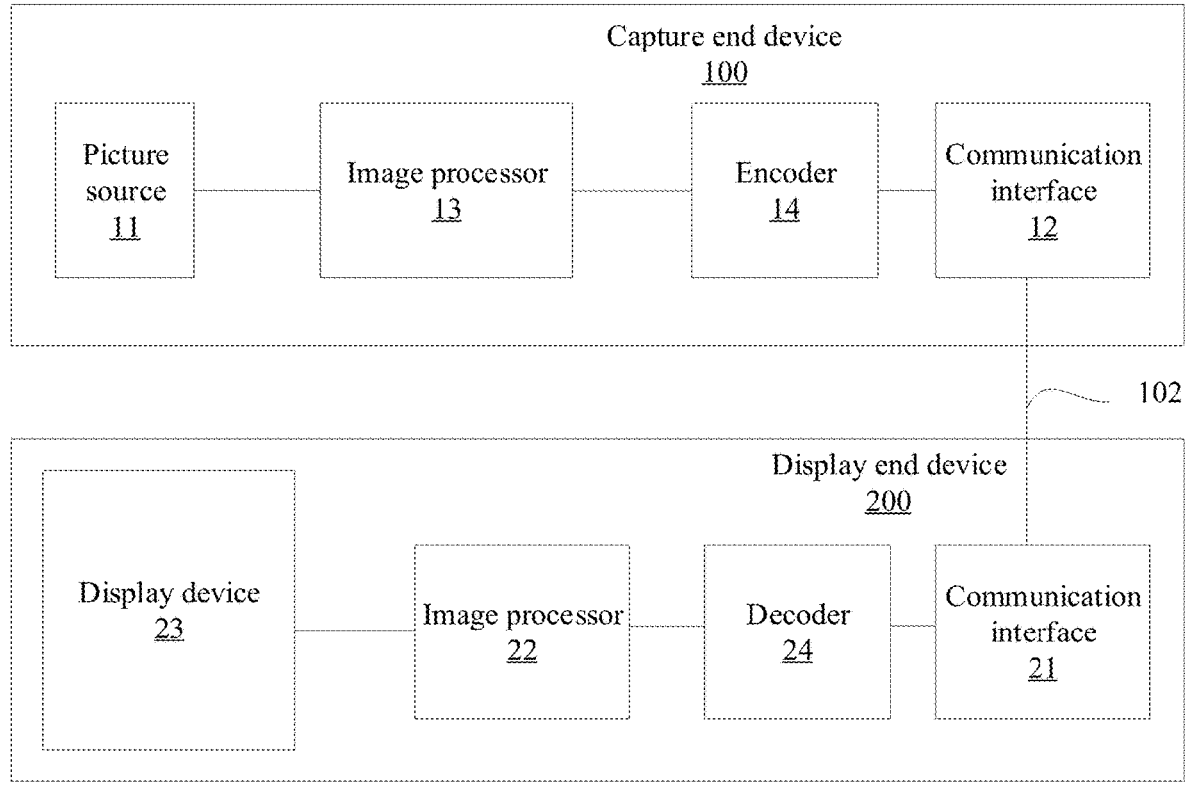
FIG. 1B is a block diagram of another image display system according to an embodiment of this application.

FIG. 1A and FIG. 1B each are a block diagram of an example of an image display system according to an embodiment of this application. An image display system may include a capture end device 100 and a display end device 200. For example, the capture end device 100 may capture an image, and the captured image may be an HDR image or a standard dynamic range (standard dynamic range, SDR) image. The display end device 200 may display the image captured by the capture end device 100.

The capture end device 100 and the display end device 200 may be communicatively connected through a link 102, and the display end device 200 may receive image data from the capture end device 100 on the link 102. The link 102 may include one or more communication media or apparatuses. The one or more communication media may include a wireless communication medium and/or a wired communication medium, for example, a radio frequency (radio frequency, RF) spectrum or one or more physical transmission lines. Optionally, the one or more communication media may form a part of a packet-based network, and the packet-based network may be, for example, a local area network, a wide area network, or a global network (for example, the Internet). The one or more communication media may include a router, a switch, a base station, or another device that facilitates communication from the capture end device 100 to the display end device 200. In an optional case, the link 102 may be a Bluetooth wireless link.

For example, the capture end device 100 includes a picture source 11 and a communication interface 12. The communication interface 12 may also be referred to as a transmission interface. In addition, optionally, the capture end device 100 may further include an image processor 13. In a specific implementation, the image processor 13, the picture source 11, and the communication interface 12 may be a hardware component in the capture end device 100, or may be a software program in the capture end device 100, or the communication interface 12 may be a combination of a hardware module and a software program.

The picture source 11 may include or may be any type of picture capture device that is, for example, used for capturing real world pictures, and/or any type of picture or comment (for screen content encoding, some text on a screen is also considered to be part of a picture or an image to be encoded) generation device, for example, a computer graphics processor for generating computer animated pictures, or any type of device that is used for obtaining and/or providing real world pictures and computer animated pictures (for example, screen content and virtual reality (virtual reality, VR) pictures), and/or any combination thereof (for example, an augmented reality (augmented reality, AR) picture). For example, the picture source 11 may be a camera for capturing a picture or a memory for storing a picture. The picture source 11 may further include any type of (internal or external) interface that stores a previously captured or generated picture and/or obtains or receives a picture. When the picture source 11 is a camera, the picture source 11 may be, for example, a local camera or an integrated camera that is integrated in the capture end device. When the picture source 11 is a memory, the picture source 11 may be a local memory or, for example, an integrated memory that is integrated in the capture end device. When the picture source 11 includes an interface, the interface may be, for example, an external interface for receiving a picture from an external video source. The external video source is, for example, an external picture capture device, for example, a camera, an external memory, or an external picture generation device. The external picture generation device is, for example, an external computer graphics processor, a computer, or a server.

The picture may be considered as a two-dimensional array or matrix of pixels. A pixel in the array may also be referred to as a sample. In an optional case, to represent a color, each pixel includes three color components. For example, in an RGB format or color space, a picture includes corresponding red, green, and blue sample arrays. However, in video encoding, each pixel is usually indicated in a luminance/chrominance format or color space. For example, a picture in a YUV format includes a luminance component represented by Y (or sometimes L) and two chrominance components represented by U and V. The luminance (luma) component Y indicates luminance or grayscale (for example, both are the same in a grayscale picture), while the two chrominance (chroma) components U and V indicate chrominance or color information components. Correspondingly, a picture in a YUV format includes a luminance sample array of luminance sample values (Y) and two chrominance sample arrays of chrominance values (U and V). A picture in an RGB format may be converted into a picture in a YUV format, and vice versa. This process is also referred to as color conversion or color format conversion. If a picture is monochrome, the picture may include only a luminance sample array. In this embodiment of this application, a picture transmitted by the picture source 11 to the image processor may also be referred to as original picture data.

The image processor 13 is configured to perform image processing, such as luminance mapping, tone mapping (tone mapping), color format conversion (for example, from an RGB format to a YUV format), color gamut conversion, saturation adjustment, color modulation, resolution adjustment, or denoising.

The communication interface 12 may be configured to receive picture data obtained through image processing, and transmit the picture data obtained through image processing to the display end device 200 on the link 102 for further image processing, or transmit the picture data to the memory for storage. For example, the communication interface 12 may be configured to encapsulate the picture data obtained through image processing into a proper format, for example, a data packet, for transmission on the link 102.

In some embodiments, the image processor further has an encoding function, and is configured to encode processed image data.

In some other embodiments, the capture end device 100 may further include an encoder 14. The encoder is configured to encode image data processed by the image processor 13, as shown in FIG. 1B.

The display end device 200 includes a communication interface 21, an image processor 22, and a display device 23. The following describes the components separately.

The communication interface 21 may be configured to receive the picture data obtained through image processing from the capture end device 100 or any other source, where the any other source is, for example, a storage device. For example, for specific examples of the communication interface 12 and the communication interface 21, refer to the foregoing description of the interface. Details are not described herein again. The communication interface 21 may be configured to transmit or receive the picture data obtained through image processing on the link 102 or any other type of network between the capture end device 100 and the display end device 200, and the communication interface 21 may be, for example, configured to decapsulate a data packet transmitted by the communication interface 12 to obtain the picture data obtained through image processing.

Both the communication interface 21 and the communication interface 12 may be configured as a unidirectional communication interface or a bidirectional communication interface, and may be, for example, configured to send and receive a message to establish a connection, acknowledge and exchange any other information related to a communication link, and/or, for example, picture data obtained through image processing, and/or data transmission. For example, the communication interface 21 and the communication interface 12 may be any type of interfaces according to any proprietary or standardized interface protocol, for example, a high definition multimedia interface (high definition multimedia interface, HDMI), a mobile industry processor interface (Mobile Industry Processor Interface, MIPI), an MIPI standardized display serial interface (Display Serial Interface, DSI), a Video Electronics Standards Association (Video Electronics Standards Association, VESA) standardized embedded display port (Embedded Display Port, eDP), a display port (DP), or a V-By-One interface, where the V-By-One interface is a digital interface standard developed for image transmission; and various wired or wireless interfaces and optical interfaces.

The image processor 22 is configured to perform tone mapping on the picture data obtained through image processing, to obtain picture data obtained through tone mapping. The image processor 22 may further perform super-resolution processing, color format conversion (for example, conversion from a YUV format to an RGB format), denoising, color gamut conversion, saturation adjustment, luminance mapping, upsampling, downsampling, image sharpening, and the like, and may be further used to transmit the picture data obtained through tone mapping to the display device 23. It should be understood that the image processor 13 and the image processor 22 each may be a general-purpose central processing unit (Central Processing Unit, CPU), a system on chip (System on Chip, SOC), a processor integrated in an SOC, a separate processor chip, a controller, or the like. The image processor 22 and the image processor 13 may further be dedicated processing devices, for example, may include an application-specific integrated circuit (Application Specific Integrated Circuit, ASIC), an image signal processor (image signal processor, ISP), a field programmable gate array (Field Programmable Gate Array, FPGA), a digital signal processor (Digital Signal Processor, a DSP), a dedicated video or graphics processing unit, a graphics processing unit (Graphics Processing Unit, GPU), a neural network processing unit (Neural-network Processing Unit, NPU), and the like. The image processor 13 and the image processor 22 each may be a processor group including a plurality of processors, and the plurality of processors are coupled to each other through one or more buses.

The display device 23 is configured to receive the picture data obtained through tone mapping, to display the picture to a user or a viewer. The display device 23 may be or include any type of display configured to present a reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other display. In an optional case, the display device 23 has an image processing function, and the display device 23 may alternatively perform tone mapping on an image. In an optional case, the display device 23 may not be disposed in the display end device 200. It may be understood that the display end device 200 does not have a display function.

In some embodiments, the image processor 22 further has an encoding function, and is configured to encode the processed image data.

In other embodiments, the display end device 200 may further include a decoder 24. The decoder 24 is configured to decode a received bitstream, as shown in FIG. 1B.

In an optional case, one image processing apparatus may have functions of both the capture end device 100 and the display end device 200. For example, a smart mobile phone includes a camera, an image processor, and a display. The camera corresponds to the capture end device 100, the image processor corresponds to the display end device 200, and the display corresponds to the display device 23. For another example, a smart television includes a camera, an image processor, and a display. The camera corresponds to the capture end device 100, the image processor corresponds to the display end device 200, and the display corresponds to the display device 23.

In a possible scenario, the capture end device 100 needs to transmit, to the display end device, a video stream including a plurality of consecutive images. Before transmitting the video stream to the display end device 200, the capture end device 100 may encode each image in the video stream into a bitstream and transmit the bitstream to the display end device 200 on the link 102. In this scenario, after receiving the encoded bitstream, the display end device 200 decodes the bitstream to obtain each image in the video stream, and then further processes each image. In an example, in this scenario, the capture end device 100 may be referred to as an encoder or an encoding device, and the display end device 200 may be referred to as a decoder or a decoding device.

In an optional case, the display end device includes a hardware layer, an operating system layer running on the hardware layer, and an application layer running on the operating system layer. The hardware layer includes hardware such as a CPU, a memory management unit (memory management unit, MMU), and a memory (also referred to as a main memory). An operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, in this embodiment of this application, no particular limitation is imposed on a specific structure of an execution body of the method provided in embodiments of this application, provided that related code can be run to implement the method provided in embodiments of this application to perform image processing. For example, the method provided in embodiments of this application may be performed by an electronic device, or may be performed by a functional module that is in the electronic device and that can invoke a program and execute the program, for example, may be a processor in the electronic device.

It should be understood that the capture end device 100 and the display end device 200 may include any type of handheld or static devices, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming transmission device (for example, a content service server or a content distribution server), a broadcast receiver device, a broadcast transmitter device, and the like, and may not use or may use any type of operating system.

Currently, when performing photographing, to record a high dynamic range of a real scene, the capture end device uses multiple frames of pictures with different exposures to perform fusion or uses a sensor (sensor) with a high dynamic range to obtain an image with a large quantity of bits. However, to retain highlighted details, after image processing, a highlighted area usually needs to be compressed when a JPG image or a video with a small quantity of bits (for example, 8 bits) is stored. The image data of the capture end device is compressed and encoded, and then distributed. Generally, maximum luminance of a display of the display end device can reach 600-1200 nits. However, the screen luminance is adaptively adjusted as ambient light changes. When the ambient light is lower than 1000 nits, the luminance is only approximately 200 nits. The decoded image data is directly displayed regardless of the luminance. As a result, display effect on the display end device may differ greatly from that on the capture end device.

Based on this, embodiments of this application provide an image capture method, an image display method, and an apparatus, to reduce a difference between an image of a capture end device and an image displayed on a display end device.

Figure 2:
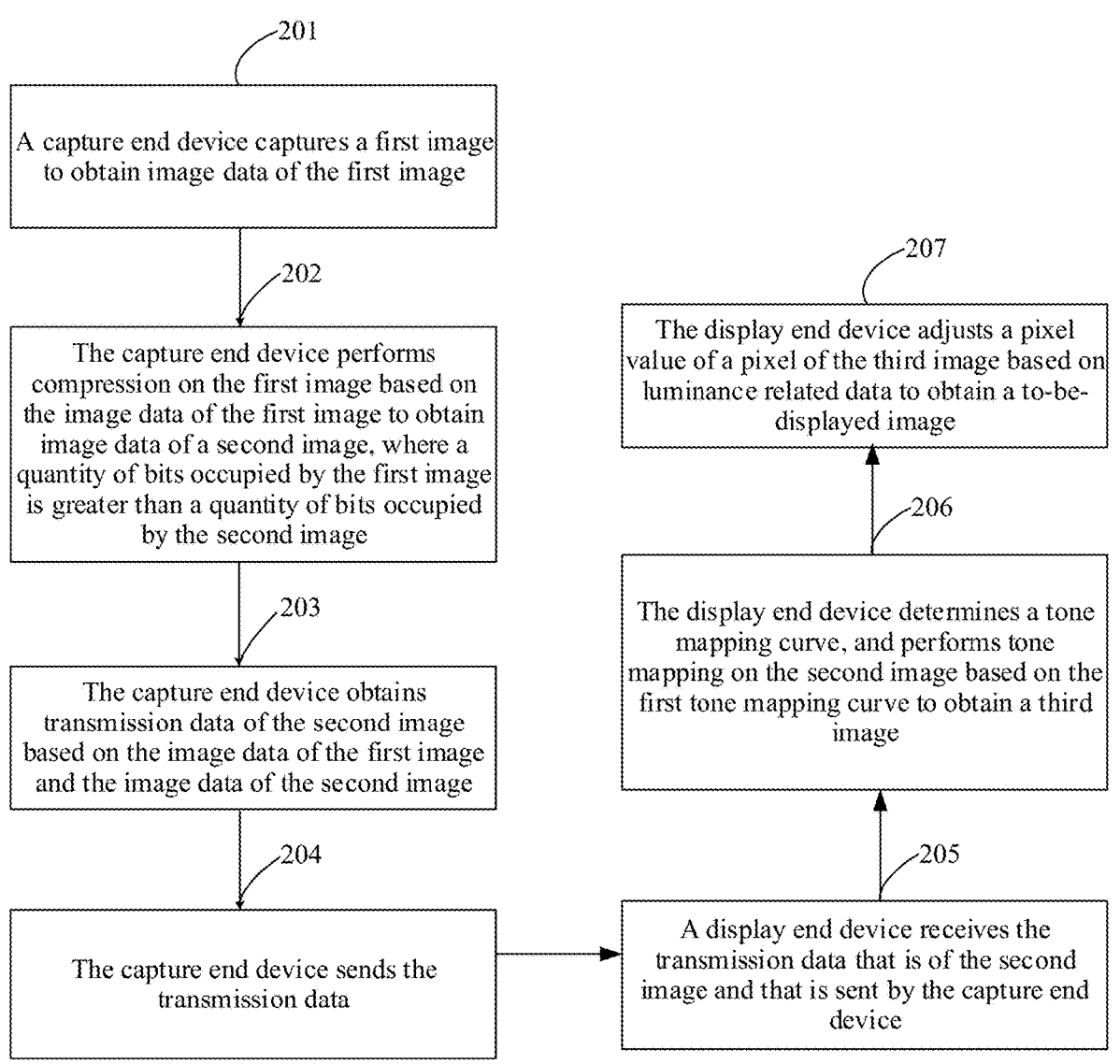
FIG. 2 is a schematic flowchart of an image processing method according to an embodiment of this application.

FIG. 2 is a schematic flowchart of an image processing method according to an embodiment of this application. Steps 201 to 204 of the method may be applied to a capture end device. For example, steps 201 to 204 of the method may be implemented by one or more processors. The one or more processors may include the image processor in the capture end device 100 shown in FIG. 1A or FIG. 1B. In other words, steps 201 to 204 shown in FIG. 2 may be implemented on an encoder. Steps 205 to 207 of the method may be applied to a display end device. For example, steps 205 to 207 of the method may be implemented by one or more processors. The one or more processors may include the image processor in the display end device 200 shown in FIG. 1A or FIG. 1B. In other words, steps 205 to 207 shown in FIG. 2 are implemented on a decoder.

201: The capture end device captures a first image to obtain image data of the first image. It should be noted that the first image may be an image photographed by using an image sensor, or may be an image obtained by fusing multiple frames of images with different exposures captured by using an image sensor, or may be a video frame image in a photographed video stream.

In a possible design, a format of the image data of the first image may include one of the following: a RAW format, an RGB format or a YUV format, an HSV format, a Lab format, a CMY format, or a YCbCr format.

For example, the image frame format of the image captured by the image sensor in the capture end device may be the RAW format, and the RAW format varies according to different sensor designs. For example, the RAW format may be a plurality of formats such as Bayer RGGB, RYYB, RCCC, RCCB, RGBW, and CMYW. In some embodiments, the capture end device may further include an ISP that converts RAW images in various formats into an RGB format. The ISP can also convert the RAW format into one of the following: the YUV format, the HSV format, the Lab format, the CMY format, and the YCbCr format.

It should be noted that the first image captured by the capture end device occupies a large quantity of bits to indicate a relative luminance relationship of the photographed scene as much as possible, and no data compression may be performed. For example, a quantity of bits of the first image is 12 bits.

202: The capture end device performs compression on the first image based on the image data of the first image to obtain image data of a second image, where the quantity of bits of the first image is greater than a quantity of bits of the second image.

In this embodiment of this application, compression is compressing image data of a large quantity of bits into image data of a small quantity of bits. Herein, to facilitate differentiation from the first image, the compressed image is referred to as the second image.

203: The capture end device obtains transmission data of the second image based on the image data of the first image and the image data of the second image.

For example, luminance related data may be obtained based on the image data of the first image and the image data of the second image. To distinguish from subsequent luminance related data, the obtained luminance related data is referred to as first luminance related data herein. The transmission data of the second image includes encoded data of the second image and first luminance related data, and the first luminance related data is used to represent a luminance mapping relationship between the first image and the second image. The luminance related data in this embodiment of this application may also be referred to as luminance increase relationship data or luminance increase data, or lightmap data, or hdrlayer data, HDR layer data, or the like. This is not specifically limited in embodiments of this application.

In a possible example, the first luminance related data may be determined based on a ratio of a luminance value of a pixel of the first image to a luminance value of a corresponding pixel of the second image. A first pixel is used as an example. The first luminance related data may be a ratio of a luminance value of a first pixel of the first image to a luminance value of a first pixel of the second image, or a value obtained by adjusting the ratio. A specific adjustment manner is described in detail later. Details are not described herein again. In another example, the first luminance related data may alternatively be a change value of a luminance value of a pixel of the second image relative to a luminance value of a corresponding pixel of the first image, or a value obtained by further adjusting the change value. A specific adjustment manner is described in detail later. Details are not described herein again. A first pixel is used as an example. The first luminance related data may be a change value of a luminance value of a first pixel of the second image relative to a luminance value of a first pixel of the first image.

In another possible example, an image may be divided into image blocks, and then the first luminance related data of the image block is determined based on luminance values of the corresponding image blocks of the two images. The luminance values of the image blocks may be a ratio or a change value between average luminance values (or maximum luminance values or minimum luminance values) of pixels included in the image blocks. For example, both the first image and the second image are divided into Km*Kn image blocks. Both Km and Kn are positive integers. A ratio is used as an example. First luminance related data of an $i^{th}$ image block may be a ratio of an average luminance value of a pixel included in an $i^{th}$ image block of the first image to an average luminance value of a pixel included in an $i^{th}$ image block of the second image, a ratio of a maximum luminance value of a pixel included in an $i^{th}$ image block of the first image to a maximum luminance value of a pixel included in an $i^{th}$ image block of the second image, or a ratio of a minimum luminance value of a pixel included in an $i^{th}$ image block of the first image to a minimum luminance value of a pixel included in an $i^{th}$ image block of the second image. A value of i is greater than 0 and less than or equal to Km*Kn.

In some possible embodiments, to reduce bits of the first luminance related data in an encoding and transmission process, normalization may be performed on the image data of the first image and the image data of the second image, and then the first luminance related data is obtained based on normalized data.

For example, normalization may be performed on the image data of the first image and the image data of the second image based on the quantity of bits of the first image and the quantity of bits of the second image. For ease of differentiation, normalized data obtained by performing normalization on the first image is referred to as first normalized data, and normalized data obtained by performing normalization on the second image is referred to as second normalized data. Further, the first luminance related data is obtained based on the first normalized data and the second normalized data. For example, the first luminance related data is the ratio of the luminance value of the pixel of the first image to the luminance value of the corresponding pixel of the second image. After normalization, the ratio of the luminance value of the pixel in the first normalized data to the luminance value of the corresponding pixel in the second normalized data may be used as the luminance related data of the pixel.

For example, if the image data of the second image with a small quantity of bits is normalized to [0, X], a range of the normalized data of the first image may be further determined based on the quantity of bits of the first image and the quantity of bits of the second image. For example, the quantity of bits of the first image is N, the quantity of bits of the second image is M, and the range of the normalized data of the first image is [0, X]. Further, it may be determined that a range of the normalized data of the second image is [0, X]. $Y/X=2^{M-N}$. For example, the quantity of bits of the first image is 8 bits, and the image data of the first image may be normalized to [0, 1.0]. If the quantity of bits of the second image is 12 bits, the image data of the second image may be normalized to [0, 16.0].

In some embodiments, before the image data of the second image is transmitted, encoding and transmission need to be performed. Specifically, an original image may be converted into a media data format that is easily recognized by human eyes and occupies less storage space. The media data format of the image may include, for example, an ipg format, a jpge format, a bmp format, a tga format, a png format, a gif format, and the like. A media format of a video frame may include, for example, an MPEG format, an AVI format, an nAVI format, an ASF format, an MOV format, a WMV format, a 3GP format, an RM format, an RMVB format, an FLV/F4V format, an H.264 format, an H.265 format, and the like. For example, when the first luminance related data is encoded, encoding may be performed by using an encoding format of the encoded data of the second image. For example, the encoded data of the second image is in a jpg format, that is, the second image is encoded into a jpg image. The first luminance related data may also be encoded into a jpg image. Then, the jpg image encoded from the second image is linked to the jpg image encoded from the first luminance related data. For another example, the image data of the second image and the first luminance related data may alternatively be encoded into one jpg image.

204: The capture end device sends the transmission data. The display end device is configured to perform steps 205 to 207.

205: The display end device receives the transmission data that is of the second image and that is sent by the capture end device. The transmission data includes the encoded data of the second image and the first luminance related data.

206: The display end device determines a tone mapping curve, and performs tone mapping on the second image based on the first tone mapping curve to obtain a third image.

207: The display end device adjusts a pixel value of a pixel of the third image based on the luminance related data to obtain a to-be-displayed image.

In the current solution, when the capture end device performs photographing, although a large number of highlighted details are retained, a relative light-dark relationship of a real scene is not completely recorded, and the relative light-dark relationship is weakened. However, in this embodiment of this application, details of a photographed image are transmitted to the display end device by using the first luminance related data. Further, the display end device may adjust a pixel value of the received image based on the first luminance related data to obtain the to-be-displayed image, so that the to-be-displayed image is more similar to the image captured by the capture end device.

In some possible scenarios, the scene captured by the capture end device may include a highlighted object, for example, the sun or jewelry. An overexposed area may also exist in an image that has a large quantity of bits and that is captured by the capture end device. Although highlighted area information loss caused by bit width and ISP processing can be resolved by using the first luminance related data, because a human eye response is non-linear and a pixel-level proportion or a block-level proportion in the first luminance related data is linear, to improve accuracy, an optical electro conversion curve may be used to adjust luminance related data of a pixel or an image block corresponding to a specified highlighted object, so that the adjusted first luminance related data meets a conversion relationship of the optical electro conversion curve. For ease of distinguishing, adjustment of the luminance related data of the area in which the highlighted object is located is referred to as first adjustment of the luminance related data.

In some embodiments, due to non-linear human sight, when compression is performed, for example, after a 12-bit image is compressed into an 8-bit image, the 8-bit image may be further compressed based on an S curve, so that details of the image are enhanced. However, when the S curve is used, luminance values of some pixels of the second image may be greater than luminance values of corresponding pixels of the first image. Therefore, the determined luminance related data (a ratio or an adjustment value) may be further adjusted, so that a luminance value of a pixel of the second image is no longer greater than a luminance value of a corresponding pixel of the first image. For ease of distinguishing, adjustment herein is referred to as second adjustment of the luminance related data. It should be noted that the luminance related data of the area of the highlighted object may be adjusted, that is, the first adjustment of the luminance related data, and then the adjustment herein is adjusted, that is, the second adjustment of the luminance related data. Alternatively, adjustment herein may be performed, that is, second adjustment of the luminance related data, and then the luminance related data of the area of the highlighted object is adjusted, that is, first adjustment of the luminance related data. This is not specifically limited in embodiments of this application.

In some embodiments, the scene captured by the capture end device may not include the highlighted object. In this case, adjustment of the luminance related data of the area in which the highlighted object is located may not be performed. In this case, after the ratio or the adjustment value is determined, the first luminance related data of each pixel or each image block may be obtained after second adjustment of the luminance related data.

Figure 3:
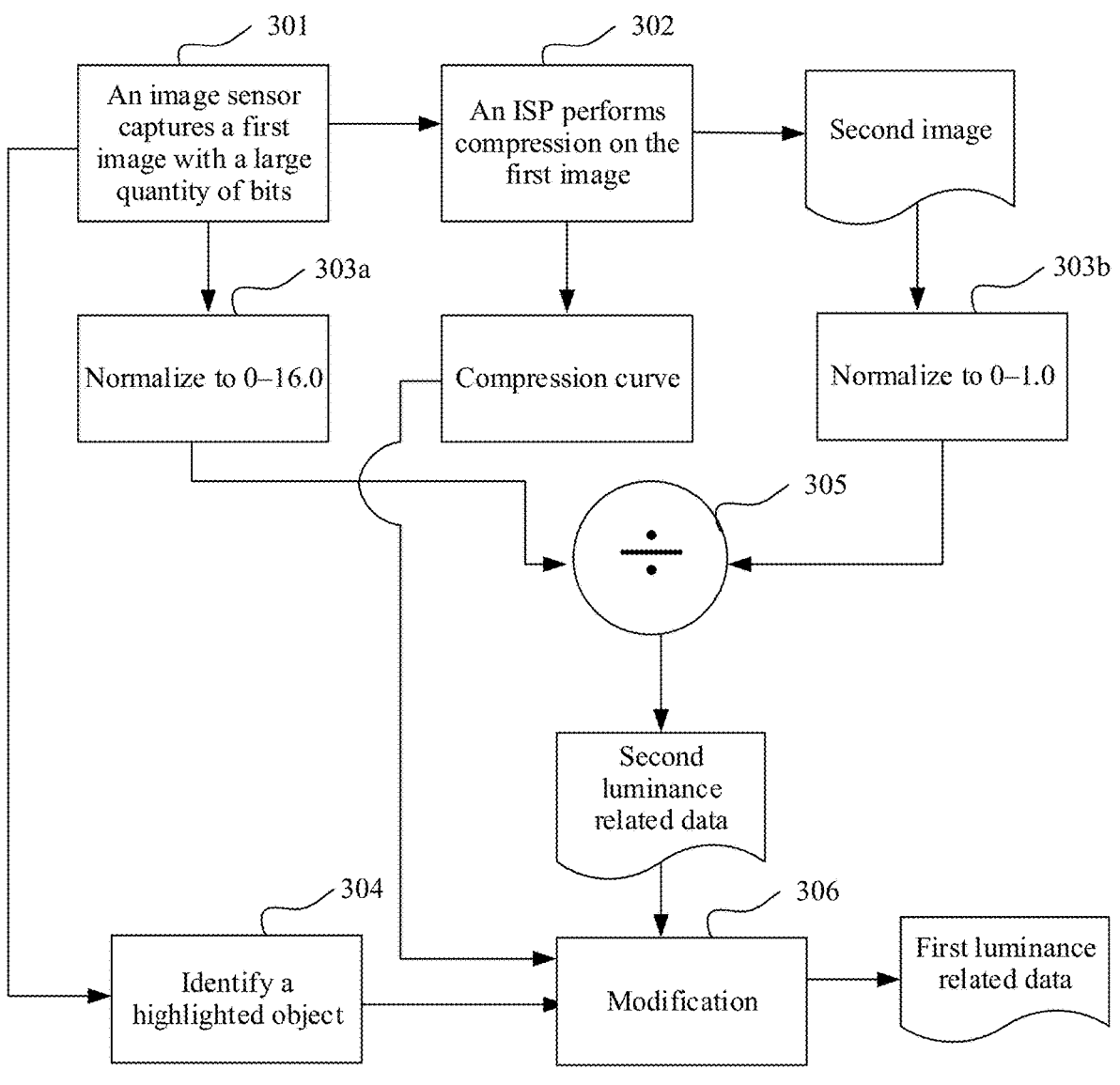
FIG. 3 is a schematic flowchart of an image capture method performed by a capture end device according to an embodiment of this application.

The following describes a procedure of a method performed by a capture end device in embodiments of this application with reference to a scenario in which a highlighted object exists. As shown in FIG. 3, a pixel-level ratio is used as an example for luminance related data.

301: An image sensor in the capture end device captures a first image with a large quantity of bits to obtain image data of the first image. For example, the quantity of bits of the first image is 12 bits.

302: An ISP in the capture end device performs compression on the first image to obtain image data of a second image. For example, a quantity of bits of the second image is 8 bits.

For example, when performing compression on the first image, the ISP of the capture end device may perform compression on the first image based on a compression curve to obtain the image data of the second image.

In some embodiments, after the 12-bit first image is compressed into the 8-bit image, detail enhancement may be performed on the 8-bit image based on an S curve to obtain the second image. For example, a compression curve for compressing the 12-bit first image into the second image may be obtained.

303a: The capture end device performs normalization on the image data of the first image to obtain normalized data of the first image. For example, the image data of the second image is normalized to 0-16.0.

303b: The capture end device performs normalization on the image data of the second image to obtain normalized data of the second image. For example, the image data of the first image is normalized to 0-1.0.

304: The capture end device identifies a highlighted object in the first image, for example, the sun or jewelry. When the highlighted object is identified, a specified highlight classification network, for example, a neural network, may be used to identify the highlighted object from the first image. The highlight classification network for identifying the highlighted object is not specifically limited in embodiments of this application.

305: The capture end device performs ratio processing on the normalized data of the first image and the normalized data of the second image to obtain luminance related data of each pixel. For ease of distinguishing, the ratio herein is referred to as second luminance related data.

For example, the second luminance related data meets the condition shown in Equation (1).

$$hdrlayer_i = pixel_i^x \div pixel_i^y \qquad \text{Equation (1)}$$

$hdrlayer_i$ indicates second luminance related data of an $i^{th}$ pixel, $$pixel_i^x$$

indicates normalized data of a pixel value of an $i^{th}$ pixel of the first image, and $$pixel_i^y$$

indicates normalized data of a pixel value of an $i^{th}$ pixel of the second image. A value of i is a positive integer less than or equal to a quantity of pixels of the first image or the second image.

306: The capture end device performs modification on the second luminance related data to obtain the first luminance related data. For example, modification is performed on an area of the highlighted object, that is, first adjustment of the luminance related data. For another example, second adjustment is performed on the luminance related data obtained through first adjustment based on the compression curve. For example, if processing is performed on the compression curve based on the S curve, second adjustment may be performed.

Further, the capture end device performs encoding on the second image before outputting the second image. In some embodiments, at least one tone mapping (TM) curve and/or screen related information may be encoded in addition to encoding the first luminance related data and the image data of the second image. In this case, in addition to the first luminance related data and the encoded data of the second image, the transmission data may further include the at least one tone mapping curve and/or the screen related information. In a possible example, the TM curve may be generated based on a screen backlight parameter of the capture end device and histogram information of the second image. In some scenarios, block-based histogram statistics may be performed on the second image to generate TM curves corresponding to different blocks. For example, the second image is divided into M*N image blocks. Histogram statistics are performed on each image block to generate the TM curves corresponding to the different blocks. It should be noted that a manner of generating the TM curve is not limited in embodiments of this application. For example, a histogram equalization method may be used, or another method may be used. This is not specifically limited in embodiments of this application. In another possible example, different tone mapping curve relationships between the screen parameter of the capture end device and specified screen parameters may be generated in a configuration manner. For example, the screen parameter of the capture end device is 1000 nits, and screens with device screen parameters of 500 nits, 200 nits, and 10 nits are correspondingly specified. For example, a same scene image may be displayed by four object screens including 1000-nit, 500-nit, 200-nit, and 10-nit screens. A color modulation person adjusts the 500-nit, 200-nit, and 10-nit screens by using an adjustment algorithm or software, so that display effect of the 500-nit, 200-nit, and 10-nit screens is as close as possible to that of the 1000-nit screen. In this way, the tone mapping curve between the 1000-nit screen and the corresponding 500-nit, 200-nit, and 10-nit screens is obtained. In some embodiments, different tone mapping curves between the screen parameter of the capture end device and screens with a plurality of specified screen parameters may alternatively be obtained in another processing manner.

In some embodiments, the screen related information may be a screen backlight parameter of the capture end device, a mapping relationship between backlight luminance under a screen backlight parameter of the capture end device and backlight luminance under at least one specified screen backlight parameter, or an adjustment ratio of backlight luminance under at least one specified screen backlight parameter to backlight luminance under a screen backlight parameter of the capture end device.

For example, the second image is encoded into a jpg image. When encoding the first luminance related data, the image data of the second image, the at least one tone mapping (TM) curve, and/or the screen related information, the image data of the second image may be encoded into a jpg image, then the first luminance related data may be encoded into another jpg image, and then encoded data of the two jpg images may be connected. The at least one tone mapping (TM) curve and/or the screen related information may be carried as metadata in an APP field of the jpg map. A specific encoding manner is not specifically limited in this application.

For example, the encoded data of the second image may be obtained through encoding in a joint photographic experts group (JPEG) format.

FIG. 4 is a schematic flowchart of an image encoding method according to an embodiment of this application. The method uses an encoding apparatus.

401: Encode image data of a second image and first luminance related data into a bitstream, where the bitstream includes a joint photographic experts group (JPEG) file, the JPEG file carries the image data of the second image and the first luminance related data, the image data of the second image is obtained by compressing image data of a first image, a quantity of bits of the first image is greater than a quantity of bits of the second image, and the first luminance related data is used to represent a luminance mapping relationship between the first image and the second image.

402: Send the bitstream.

The first luminance related data and the image data of the second image may be encoded into a same image frame, or may be encoded into different image frames. Being encoded into different image frames may be understood as that the image data of the second image may be encoded into one JPEG image frame, and the first luminance related data is encoded into another JPEG image frame. For example, the one or more JPEG image frames are connected to a JPEG image frame that includes encoded data of the second image.

In some embodiments, the at least one tone mapping (TM) curve and/or screen related information mentioned above and the image data of the second image may be encoded into a same JPEG image frame, or the at least one tone mapping (TM) curve and/or screen related information mentioned above may be encoded into another JPEG image frame different from a JPEG image frame for encoding the image data of the second image.

The following describes a format of a JPEG image frame. The JPEG format of the image frame is the most commonly used image file format, with the extension .jpg or jpeg. For example, the JPEG image frame is stored in a JFIF (JPEG file interchange format). The JPEG image frame may include a start of image (Start of Image, SOI) field, an image frame header, a payload, and an end of frame (end of frame, EOI) field.

In the SOI field, tag information indicating the start of an original image is recorded. In the image frame header, information such as a JPEG as an encoding scheme, an image size, a quantization table, a Huffman table, and the like may be recorded. In the payload, the actual encoded original image is recorded. In the EOI field, tag information indicating the end of the original image is recorded.

The image frame header may include one or more of the following: an application identifier (application, APP) field, a start of frame (start of frame, SOF) field, a define Huffman table (Define Huffman Table, DHT) field, a define restart interval (Define Restart Interval, DRI) field, a start of scan (Start of Scan, SOS) field, and the like. The APP field may include APP0, APP1, . . . , and APPn. n=0-15 (optional).

(1) SOI field: Tag code occupies two bytes and is generally a fixed value 0xFFD8.

(2) APP0 field: Tag code occupies two bytes and is generally a fixed value 0xFFE0. The APP0 field may include nine specific fields:

① Data length, occupying two bytes and indicating a total length of the nine fields ① to ⑨, that is, excluding the tag code but including this field.

② Identifier, occupying five bytes and being generally a fixed value 0x4A46494600, that is, a character string "JFIF0".

③ Version number, occupying two bytes and being generally a fixed value 0x0102, indicating the version number 1.2 of the JFIF. Other values may indicate other versions.

④ Density unit of X and Y, occupying one byte. Three values are available. 0 indicates that there is no unit. 1 indicates pixels/inch. 2 indicates pixels/centimeter.

⑤ X-direction pixel density, occupying two bytes.

⑥ Y-direction pixel density, occupying two bytes.

⑦ Thumbnail horizontal pixel quantity, occupying one byte.

⑧ Thumbnail vertical pixel quantity, occupying one byte.

⑨ Thumbnail RGB bitmap, the occupation length may be a multiple of 3, indicating thumbnail RGB bitmap data. This tag field may include a miniature version of the image, stored as 24-bit RGB pixels. If there is no miniature image (which is more common), values of the field ⑦ "thumbnail horizontal pixel quantity" and the field ⑧ "Thumbnail vertical pixel quantity" are both 0.

(3) APPn: Application identifier (Application) n, where n=1-15 (optional).

Tag code occupies two bytes and is generally a fixed value ranging from 0xFFE1 to 0xFFF.

APPn may include two specific fields:

① Data length, occupying two bytes and indicating a total length of the two fields ① and ②, that is, excluding the tag code but including this field.

② Detailed information, generally the data length is two bytes.

(4) DQT: Tag code occupies two bytes and is generally a fixed value 0xFFDB.

DQT may include nine specific fields:

① Data length, being two bytes and indicating a total length of the field ① and a plurality of fields ②, that is, excluding the tag code but including this field.

② Quantization table, the occupied data length is two bytes. The quantization table includes (a) and (b) as follows.

(a) Precision and quantization table ID, generally occupying one byte. Upper four bits indicate precision, the value 0 indicates eight bits, and the value 1 indicates 16 bits. Lower four bits indicate a quantization table ID, and the value ranges from 0 to 3.

(b) An entry, generally occupying (64*(precision+1)) bytes. For example, a quantization table with 8-bit precision has an entry length of 64*(0+1)=64 bytes. In this tag field, the field ② may be repeated to indicate a plurality of quantization tables.

(5) SOF0: Tag code is two bytes and is generally a fixed value 0xFFC0.

SOF0 may include nine specific fields:

① Data length, being two bytes and indicating a total length of six fields ① to ⑥, that is, excluding the tag code but including this field.

② Precision, occupying one byte and indicating a quantity of bits of each data sample, usually 8 bits.

③ Image height, occupying two bytes and indicating an image height (unit: pixel).

④ Image width, occupying two bytes and indicating an image width (unit: pixel).

⑤ Quantity of color components, occupying one byte. The value 1 indicates a grayscale image. The value 3 indicates YCrCb or YIQ. The value 4 indicates CMYK. The JFIF uses YCrCb. Therefore, the quantity of color components is 3.

⑥ Color component information, occupying the quantity of color components*3 bytes (usually nine bytes). The color component information includes the following:

(a) Color component ID, occupying one byte.

(b) Horizontal/vertical sampling factor, occupying one byte. Generally, the upper four bits indicate the horizontal sampling factor, and the lower four bits indicate the vertical sampling factor.

(c) Quantization table, occupying one byte and is an ID of the quantization table used by the current component. In this tag field, the field ⑥ should repeatedly appear, and the quantity of color components (the field ⑤) is a quantity of times by which the field ⑥ appears.

(6) DHT: Tag code occupies two bytes and is generally a fixed value 0xFFC4.

The DHT field may include two specific fields:

① Data length, being two bytes and indicating a total length of the field ① and a plurality of fields ②, that is, excluding the tag code but including this field.

② Huffman table, the data length is two bytes. The Huffman table includes the following:

(a) Table ID and table type, occupying one byte. The upper four bits indicate the type. The value 0 indicates direct current DC. The value 1 indicates alternating current AC. The lower four bits indicate the Huffman table ID.

(b) Quantity of code words with different bits, generally occupying 16 bytes.

(c) Encoded content, a sum (16 bytes) of the quantity of code words with different bits.

In this tag field, the field ② may be repeated or may appear only once.

(7) DRI: Tag code occupies two bytes and is generally a fixed value 0xFFDD.

DRI may include two specific fields:

① Data length, being two bytes and being generally a fixed value 0x0004, indicating a total length of the two fields ① and ②, that is, excluding the tag code but including this field.

② Restart interval in a unit of a minimum coded unit (Minimum Coded Unit, MCU) block, occupying two bytes. For example, if a value of the restart interval is n, there is a reset (RST) n tag for every n MCU blocks. A first tag is RST0, a second tag is RST1, and so on. Then, after RST7, a repetition starts from RST0. If this tag field is absent or the value of the interval is 0, it indicates that the restart interval and the tag RST are absent. In JPEG, a minimum group of data units encoded at intervals is referred to as a minimum coded unit (MCU).

(8) SOS: Tag code occupies two bytes and is generally a fixed value 0xFFDA.

SOS may include four specific fields:

① Data length, being two bytes and indicating a total length of the four fields ① to ④, that is, excluding the tag code but including this field.

② Quantity of color components, occupying one byte. The value 1 indicates a grayscale image. The value 3 indicates YCrCb or YIQ. The value 4 indicates CMYK.

③ Color component information, including:

(a) Color component ID, occupying one byte.

(b) Direct current/Alternating current coefficient table number, occupying one byte. The upper four bits indicate a Huffman tree number used by a direct current component, and the lower four bits indicate a Huffman tree number used by an alternating current component.

④ Compressed image data (a) Spectrum selection start, one byte and a fixed value 0x00.

(b) Spectrum selection end, one byte and a fixed value 0x3F.

(c) Spectrum selection, one byte and always 00 in basic JPEG.

In this tag field, the field ③ should repeatedly appear, and the quantity of color components (the field ②) is a quantity of times (generally three times) by which the field ③ appears. This paragraph is followed by the real image information. The image information automatically ends when encountering tag code. Generally, a tag EOI indicates the end.

The following describes an example of an encoding and transmission manner of transmission data of the second image.

Example 1

For example, the first luminance related data and the image data of the second image are encoded into one JPEG image frame.

For example, the first luminance related data is carried in an application identifier (application, APP) field of the JPEG image frame. It may be understood that the transmission data of the second image includes the first luminance related data and the image data of the second image. The image data of the second image is included in a joint photographic experts group (JPEG) image frame encoded in a JPEG format, and the first luminance related data is carried in an application identifier APP field, for example, an APPn field, of the JPEG image frame.

In some embodiments, the first luminance related data may be carried in the application identifier APP field of the JPEG image frame in a form of metadata.

In an example, the metadata for carrying the first luminance related data is referred to as highlight enhancement metadata. For example, the highlight enhancement metadata may be represented by a syntax element enhence_metadata( ), or certainly may be represented by another syntax element. This is not specifically limited in embodiments of this application.

For example, an HDR image format corresponding to the JPEG image frame may be shown in Table 1-1. In Table 1-1, for example, the second image is an 8-bit SDR image. The first image is a 12-bit image. The transmission data of the second image is encoded into the JPEG image frame shown in Table 1-1. The first luminance related data is carried in the APPn field in a form of metadata. The tag code of the APPn field may indicate a tag of an HDR basic SDR image. It may be understood that information carried in fields other than the APPn field is all used to decode the second image.

22

TABLE 1-1

| HDR image format | SOI | start of frame | 8-bit SDR image |
|---|---|---|---|
| | APP0 | JFIF | |
| | APPn | Tag of an HDR basic SDR image | |
| | DQT | Quantization Table | |
| | DHT | Haffman table | |
| | DRI | Restart interval | |
| | SOF | Frame header | |
| | SOS | scan header | |
| | EOI | end of frame | |

For F example, for description of bitstream syntax of the APPn field, refer to Table 1-2. Certainly, the bitstream syntax of the APPn field may include more or less bitstream syntax than that in Table 1-2. This is not limited in embodiments of this application.

TABLE 1-2

| Definition of highlight metadata | Descriptor |
|---|---|
| APPn_( ){ | |
|     start_code | 0xFFEn |
|     length | u(16) |
|     ITU35_tag | u(8)*6 |
|     itu_t_t35_country_code | 0x26 |
|     if(itu_t_t35_country_code!=0xFF){ | |
|     itu_t_t35_country_code extension byte | u(8) |
|     } | |
|     terminal_provide_code | 0x04 |
|     terminal_provide_oriented_code | 0x07 |
|     ... | |
|     ... | |
|     ... | |
|     ... | |
|     ... | |
|     enhence_metadata_size | u(16) |
|     enhence_metadata( ) | |
| } | | start_code is a 16-bit unsigned integer, and indicates an identifier of the APP field of JPEG. The descriptor of the start code of APP0 is 0xFFE0, and the descriptor of the start code of APPn is 0xFFEn.

Length is a 16-bit unsigned integer, and indicates a length of the entire APP field.

ITUT35_tag is six ASCII characters, and indicates a field type tag. Generally, ASCII values are 0x49, 0x54, 0x55, 0x54, 0x33, and 0x35, indicating "ITUT35".

itu_t_t35_country_code is an 8-bit unsigned integer, and indicates code of the country of an organization to which a customized content block belongs in ITU T35. In this embodiment of this application, the HDR image format uses 0x26.

itu_t_t35_country_code_extension_byte is an 8-bit unsigned integer, indicates extension code of the country of the organization to which the customized content block belongs in ITU T35, and generally does not appear in the HDR image format.

terminal_provide_code is a 16-bit unsigned integer, and indicates code of the organization to which the customized content block belongs in ITU T35. In this embodiment of this application, the HDR image format may use 0x04.

terminal_provide_oriented_code is a 16-bit unsigned integer, and indicates code of the organization to which the customized content block belongs in ITU T35. In this embodiment of this application, the HDR image format may use 0x07.

enhence_metadata_size occupies a 16-bit unsigned positive number, and indicates a total size of the highlight enhancement metadata. The highlight enhancement metadata is used to carry the first luminance related data.

enhence_metadata( ) indicates the highlight enhancement metadata, and is used to carry the first luminance related data.

u(n) is an n-bit unsigned integer, and is obtained by converting n-bit bits.

Example 2

For example, the first luminance related data and the image data of the second image are encoded into two JPEG image frames.

The transmission data of the second image is encoded into a JPEG file. The JPEG file includes a first JPEG image frame and a second JPEG image frame. The first JPEG image frame includes the image data of the second image through encoding. The second JPEG image frame includes the first luminance related data through encoding. It may be understood that the transmission data of the second image includes the first luminance related data and the image data of the second image. The image data of the second image is included in the first joint photographic experts group (JPEG) image frame encoded in the JPEG format, and the first luminance related data is carried in the first joint photographic experts group (JPEG) image frame encoded in the JPEG format.

In some embodiments, an APP field of the first JPEG image frame may further include a location identifier for indicating a start location of the second JPEG image frame in the JPEG file. In this embodiment of this application, the identifier is referred to as a first location identifier. For example, the location identifier may be represented by a syntax element frame_offset[i]. frame_offset[i] indicates a start location of a current JPEG image frame in the JPEG file. For example, frame_offset[i] may be represented as an offset of the current JPEG image frame (for example, an $i^{th}$ image frame in the JPEG file) starting from the start location in the JPEG file.

Further, during decoding, a display end device (or a decoding apparatus in a display end device) may decode the first JPEG image frame to obtain the image data of the second image, and obtain the first location identifier; and then determine a start location of the second JPEG image frame from the JPEG file based on the first location identifier, and decode the second JPEG image frame to obtain the first luminance related data based on the start location.

In some embodiments, the APP field of the JPEG image frame may further include a file type identifier for indicating a file type of the current JPEG image frame. For example, the file type may include SDR original image data, the first luminance related data (which may also be referred to as the highlight enhancement data), and the like. In some scenarios, if the transmission data of the image further includes another type of data, and the another type of data is carried in an independent image frame, the data may also be indicated by different values of the file type identifier. For example, the file type identifier may be represented by a syntax element file_type, or may be represented by another syntax element. This is not specifically limited in embodiments of this application.

Specifically, the APP field of the first JPEG image frame and an APP field of the second JPEG image frame separately include a file type identifier. When a value of the file type identifier of the first JPEG image frame is a third value, it indicates that the APP field of the first JPEG image frame carries the image data of the second image (which may be understood as the SDR original image data). When a value of the file type identifier of the second JPEG image frame is a fourth value, it indicates that the APP field of the second JPEG image frame carries the first luminance related data (namely, the highlight enhancement data). The third value and the fourth value are different.

For example, the JPEG file includes the first JPEG image frame and the second JPEG image frame. For a format of the JPEG file, refer to Table 2-1. In Table 2-1, for example, the second image is an 8-bit SDR image. The first image is a 12-bit image. The data of the second image is encoded into the first JPEG image frame shown in Table 2-1. The first luminance related data is encoded into the second JPEG image frame shown in Table 2-1.

TABLE 2-1

| JPEG file of an image | SOI | start of frame | 8-bit SDR image (First JPEG image frame) |
| | APP0 | Application Marker (JFIF) | |
| | APPn | Related data of a second image | |
| | DQT | Quantization Table | |
| | DHT | Haffman table | |
| | DRI | Restart interval | |
| | SOF | Frame header | |
| | SOS | scan header | |
| | EOI | end of frame | |
| | SOI | start of frame | 8-bit HDR layer data (Second JPEG image frame) |
| | APPn | Highlight enhancement data | |
| | DQT | Quantization Table | |
| | DHT | Haffman table | |
| | DRI | Restart interval | |
| | SOF | Frame header | |
| | SOS | scan header | |
| | EOI | end of frame | |

For example, for description of bitstream syntax of an APPn field of the first JPEG image frame, refer to Table 2-2. Certainly, the bitstream syntax of the APPn field may include more or less bitstream syntax than that in Table 2-2. This is not limited in embodiments of this application.

TABLE 2-2

| Definition of highlight enhancement metadata | Descriptor |
| --- | --- |
| APPn_( ){ | |
|    start code | 0xFFEn |
|    length | u(16) |
|    ITUT35_tag | u(8)*6 |
|    itu_t_t35_country_code | 0x26 |
|    if(itu_t_t35_country_code!=0xFF){ | |
|    itu_t_t35_country_code extension byte | u(8) |
|    } | |
|    terminal_provide_code | u(16) |
|    terminal_provide_oriented_code | u(16) |
|    frame_number | 2 |
|    File_type | 1 |
|    ... | |
|      enhence_type | 1 |
|    ... | |
|      frame offset[0] | u(32) |
|    ... | |
|     ... | |
|    } | |

For explanations of syntax elements that are in Table 2-2 and that are the same as those in Table 1-2, refer to the related description in Table 1-2. Details are not described herein again.

frame_number occupies an 8-bit unsigned integer, and indicates a quantity of JPEG image frames included in the JPEG file.

File_type occupies a 16-bit unsigned integer, and indicates a type of a current JPEG image frame (which may also be referred to as a current JPEG independent frame). It may also be understood that a data type of data included in an APPn field of the current JPEG image frame may be referred to as a file type identifier. For example, different values indicate different data types. For example, when a value of File_type is a third value, it indicates that the current JPEG image frame carries the image data of the second image, namely, the SDR original image data. If a value of File_type is a fourth value, it indicates that the first luminance related data is encoded into the current JPEG image frame. For example, the third value is 1, the fourth value is 2, and vice versa. Certainly, another value may alternatively be used. This is not specifically limited in embodiments of this application. It should be noted that, if the transmission data of the second image further includes other data than the image data and the first luminance related data, another value may be defined to express a data type of the other data.

frame_offset[ ] is a 32-bit unsigned integer, indicates a start location of a current JPEG image frame in the JPEG file, and may be, for example, an offset of the current JPEG image frame starting from the start location in the JPEG file.

For example, for description of bitstream syntax of an APPn field of the second JPEG image frame, refer to Table 2-3. Certainly, the bitstream syntax of the APPn field may include more or less bitstream syntax than that in Table 2-3. This is not limited in embodiments of this application.

TABLE 2-3

|  | Descriptor |
| --- | --- |
| APPn_( ){ |  |
| start_code | 0xFFEn |
| length | u(16) |
| ITUT35_tag | u(8)*6 |
| itu_t_t35_country_code | u(8) |
| if(itu_t_t35_country_code!=0xFF){ |  |
| itu_t_t35_country_code extension byte | u(8) |
| } |  |
| terminal_provide_code | u(16) |
| terminal_provide_oriented_code | u(16) |
| frame_number | 2 |
| file_type | 2 |
| ... | u(8) |
| enhence_type | 1 |
| ... | u(8) |
| frame offset[0] | u(32) |
| if(enhence_type==1){ |  |
| enhence info size | u(16) |
| enhence info( ) |  |
| } |  |

For explanations of syntax elements that are in Table 2-3 and that are the same as those in Table 1-2 and Table 2-2, refer to the related descriptions in Table 1-2 and Table 2-2. Details are not described herein again.

enhence info size indicates a total size of the highlight enhancement information, and is a 16-bit unsigned integer.

enhence_Info indicates the highlight enhancement information. If enhence_type in the image frame indicates that the data is in a form of the image frame, the APP field of the image frame includes the highlight enhancement information. It should be noted that data encoded into a field other than the APP field in the image frame and the highlight enhancement information included in the APP field together form the first luminance related data. For example, the highlight enhancement information may indicate key information or a rule for processing the second image based on the first luminance related data.

In some possible scenarios, selection in the manner of Example 1 or Example 2 may be supported.

The following uses Example 3 to describe a selection solution in the manner of Example 1 or Example 2.

Example 3

For example, an identifier for indicating a data form of the first luminance related data may be added to the bitstream syntax. The identifier for the data form of the first luminance related data may be referred to as a data type identifier, and may be represented by a syntax element enhence_type. enhence_type is a 16-bit unsigned integer, and indicates the data form of the first luminance related data carried in the JPEG image frame. For example, different values indicate different data forms. When a value of the data type identifier is a first value, it indicates that the data type of the first luminance related data is a metadata type. When a value of the data type identifier is a second value, it indicates that the data type of the first luminance related data is an image frame type. For example, the value 1 indicates that an image frame form is used, and the value 2 indicates that a metadata form is used. The first value and the second value are different.

In some scenarios, the first value may be the same as the third value, and the second value may be the same as the fourth value, or the second value may be the same as the third value, and the first value is the same as the fourth value. This is not limited in this application.

For example, for a description of a bitstream syntax of an APPn field of the JPEG image frame in which the data of the second image is encoded, refer to Table 3-1.

TABLE 3-1

|  | Descriptor |
| --- | --- |
| APPn_( ){ |  |
| start_code | 0xFFEn |
| length | u(16) |
| ITU35_tag | u(8)*6 |
| itu_t_t35_country_code | 0x26 |
| if(itu_t_t35_country_code!=0xFF){ |  |
| itu_t_t35_country_code extension byte | u(8) |
| } |  |
| terminal_provide_code | 0x04 |
| terminal_provide_oriented_code | 0x07 |
| frame_number | u(8) |
| enhence_type | u(8) |
| ... |  |
| ... |  |
| for(i=0,i<frame number−1,i++){ |  |
| frame offset[i] | u(32) |
| } |  |
| if(enhence_type==2){ |  |
| enhence_metadata_size | u(16) |
| enhence_metadata( ) |  |
| } |  |
| elseif(enhence_type==1){ |  |
| enhence info size | u(16) |
| enhence info( ) |  |
| } |  |
| } |  |

For example, the transmission data includes the first luminance related data and the image data of the second image. When the data form of the first luminance related data is the metadata form, frame_number==1, and enhence_type==2. When the data form of the first luminance related data is the image frame form, frame_number==2, and enhence_type==1.

Example 4

In some scenarios, for example, in addition to the first luminance related data and the image data of the second image, the transmission data further includes at least one tone mapping curve. The tone mapping curve may include a global tone mapping (GTM) curve, or include a global tone mapping curve and a local tone mapping (LTM) curve. When a local tone mapping technology is used, an image may be divided into M*N areas, and each area corresponds to a tone mapping curve. A capture end may transfer a parameter of the at least one tone mapping curve to a display end in a form of metadata.

Therefore, the display end may decode the image data of the second image to obtain SDR image data, and when generating an HDR image based on the SDR image data and a parameter of the local tone mapping curve, the LTM technology may be reversely used to restore tone/luminance. In various embodiments, the LTM technology may be performed in any tone space, such as RGB color space or YUV color space.

The tone mapping curve may be carried in the JPEG image frame in which the image data of the second image is located, or may be carried in the JPEG image frame in which the first luminance related data is located, or may be independently carried in an independent JPEG image frame.

The following uses an example in which the tone mapping curve is carried in the JPEG image frame in which the image data of the second image is located. For example, the image data of the second image and the first luminance related data are jointly encoded into one JPEG image frame. A format of the JPEG image frame is shown in Table 1-1.

In some embodiments, the tone mapping curve is also carried in an APPn field of the JPEG image frame in a form of metadata. The APPn field may include an identifier for indicating GTM or GTM+LTM. For example, the identifier may be a tone indication identifier, or certainly may be named another name. This is not specifically limited in embodiments of this application. For example, the tone indication identifier may be represented by a syntax element meta_type. Certainly, the tone indication identifier may alternatively be represented by another syntax element. This is not specifically limited in embodiments of this application. Different values of meta_type indicate different types of tone mapping curve parameters. For example, if a value of meta_type is 1, GTM is used, or if a value of meta_type is 2, it indicates that GTM+LTM is used, and vice versa. For another example, if a value of meta_type is 0, GTM is used, or if a value of meta_type is 1, it indicates that GTM+LTM is used, and vice versa.

The metadata of the tone mapping curve may include GTM metadata, or include GTM metadata and LTM metadata.

In an example, for description of a bitstream syntax of an APPn field of the JPEG image frame, refer to Table 4-1. Certainly, the bitstream syntax of the APPn field may include more or less bitstream syntax than that in Table 4-1. This is not limited in embodiments of this application.

TABLE 4-1

| Definition of highlight adaptation data | Descriptor |
| --- | --- |
| APPn_( ){ | |
|   start_code | 0xFFEn |
|   length | u(16) |
|   ITUT35_tag | u(8)*6 |
|   itu_t_t35_country_code | u(8) |
|   if(itu_t_t35_country_code!=0xFF){ | |
|     itu_t_t35_country_code extension byte | u(8) |
|   } | |
|   terminal_provide_code | u(16) |

TABLE 4-1-continued

| Definition of highlight adaptation data | Descriptor |
| --- | --- |
|   terminal_provide_oriented_code | u(16) |
|   frame_number | 1 |
|   File_type | 1 |
|   meta_type | 2 |
|   ... | |
|   ... | |
|   if(metadata_type==2){ | |
|     HDR metadata both size | u(16) |
|     HDR metadata( ) | |
|     HDR metadata enhence( ) | |
|   } | |
|   }else if(meta_type==1){ | |
|     HDR metadata size | u(16) |
|     HDR metadata( ) | |
|   } | |
|   enhence_metadata_size | u(16) |
|   enhence_metadata( ) | |
|  } | |

For explanations of syntax elements that are in Table 4-1 and that are the same as those in Table 1-2, Table 2-2, and Table 2-3, refer to the related descriptions in Table 1-2, Table 2-2, and Table 2-3. Details are not described herein again.

HDR_metedata size indicates a data length of GTM metadata, and is a 16-bit unsigned integer. HDR metadata( ) indicates GTM metadata. HDR metadata both size indicates a data length of GTM metadata and LTM metadata, and is a 16-bit unsigned integer. HDR_metedata_enhence indicates LTM metadata.

meta_type is a 16-bit unsigned integer, and indicates a data type of a tone mapping curve parameter carried in an APP field of a current JPEG image frame. Different values of meta_type indicate different data types of the tone mapping curve parameter. For example, a value of meta_type is 1, and indicates global tone mapping GTM curve data, or a value of meta_type is 2, and indicates GTM curve data and local tone mapping LTM curve data.

The following uses an example in which the tone mapping curve is carried in the JPEG image frame in which the image data of the second image is located. For example, the image data of the second image and the first luminance related data are independently encoded into two JPEG image frames. A format of the JPEG image frame is shown in Table 2-1. The parameter of the tone mapping curve is carried in an APPn field of the first JPEG image frame.

In an example, for description of bitstream syntax of an APPn field of the first JPEG image frame, refer to Table 4-2. For description of bitstream syntax of an APPn field of the second JPEG image frame, refer to Table 2-3. Certainly, the bitstream syntax of the APPn field of the first JPEG image frame may include more or less bitstream syntax than that in Table 4-2. This is not limited in embodiments of this application.

TABLE 4-2

| | Descriptor |
| --- | --- |
| APPn_( ){ | |
|   start_code | 0xFFEn |
|   length | u(16) |
|   ITUT35_tag | u(8)*6 |
|   itu_t_t35_country_code | u(8) |
|   if(itu_t_t35_country_code!=0xFF){ | |
|     itu_t_t35_country_code extension byte | u(8) |
|   } | |
|   terminal_provide_code | u(16) |
|   terminal_provide_oriented_code | u(16) |

TABLE 4-2-continued

|  | Descriptor |
| --- | --- |
| frame__number | 2 |
| file_type | 1 |
| meta_type | 2 |
| enhence_type | 1 |
| for(i=0,i<frame number−1,i++){ | |
| frame offset[i] | u(32) |
| } | |
| if(metadata_type==2){ | |
| HDR metadata both size | u(16) |
| HDR metadata( ) | |
| HDR metadata enhence( ) | |
| } | |
| }else if(meta_type==1){ | |
| HDR metadata size | u(16) |
| HDR metadata( ) | |
| } | |
| if(enhence_type==2){ | |
| enhence_metadata_size | u(16) |
| enhence_metadata( ) | |
| } | |
| elseif(enhence_type==1){ | |
| enhence info size | u(16) |
| enhence info( ) | |
| } | |
| } | |

Example 5

In some scenarios, the transmission data may include enhancement data for scaled display. For example, the enhancement data for scaled display and the image data of the second image may be carried in a same JPEG image frame. For another example, the enhancement data for scaled display may be independently encoded into one or more JPEG image frames. In subsequent descriptions, the enhancement data for scaled display is referred to as scaled display data.

The scaled display data may include scaling enhancement data and high-frequency texture enhancement data, and may further include a tone mapping curve for scaled display.

The scaling enhancement data is used to describe a difference between a pixel of a (scale-up and/or scale-down) image of the first image and a pixel of the first image. The scaling enhancement data includes information for describing an increased pixel value of the scale-up image of the first image compared with the first image and/or information for describing a reduced pixel value of the scale-down image of the first image compared with the first image.

For example, detail information may include an RGB or YUV pixel difference of each pixel calculated pixel by pixel after a small-resolution image is scaled up to a same resolution as a large-resolution image by using a preset algorithm (bilinear interpolation, bicubic spline interpolation, or the like). Alternatively, detail information may include information included in an interpolation algorithm that has the least difference from a large-resolution image and that is selected after a small-resolution image is scaled up to a same resolution as the large-resolution image by using a preset algorithm (bilinear interpolation, bicubic spline interpolation, or the like).

The high-frequency texture enhancement data may include a difference between high-frequency texture of the (scale-up and/or scale-down) image of the first image and high-frequency texture of the first image. The high-frequency texture enhancement data includes information for describing increased high-frequency texture of the scale-up image of the first image compared with the first image or information for describing reduced high-frequency texture of the scale-down image of the first image compared with the first image.

In some embodiments, the scaling enhancement data and the high-frequency texture enhancement data may be separately and independently carried in different JPEG image frames, or may be carried in an APPn field of a JPEG image frame for carrying the image data of the second image, and may be carried in a form of metadata in the APPn field of the JPEG image frame for carrying the image data of the second image. For example, the metadata may be referred to as scaled display enhancement metadata, and the scaled display enhancement metadata is used to carry the scaled display data.

In some embodiments, the tone mapping curve for scaled display may be carried in the APPn field of the JPEG image frame for carrying the image data of the second image.

For example, the scaling enhancement data, the high-frequency texture enhancement data, or the tone mapping curve for scaled display may be indicated by defining an identifier for indicating a data type of the scaled display data. For example, the identifier may be represented by a syntax element HDR_type, or certainly may be represented by another syntax element. This is not specifically limited in embodiments of this application.

HDR_type may be a 16-bit unsigned integer, and indicates the data type of the scaled display data included in the current JPEG image. In some embodiments, the data type of the scaled display data in this embodiment of this application may include the scaling enhancement data, the high-frequency texture enhancement data, or the tone mapping curve for scaled display.

In an example, when the value is 1, it indicates that the JPEG file includes the scaling enhancement data, when the value is 2, it indicates that the high-frequency texture enhancement data is included, or when the value is 3, it indicates that the tone mapping curve for scaled display is included.

HDR_type also indicates a scaling enhancement manner. HDR_type may be referred to as a scaling enhancement manner identifier, or may use another name. This is not specifically limited in embodiments of this application.

When the scaling enhancement manner identifier is a fifth value, it indicates that the scaling enhancement manner is superimposing the scaling enhancement data on an image obtained by enhancing the second image based on the first luminance related data; when the scaling enhancement manner identifier is a sixth value, it indicates that the scaling enhancement manner is weighted superimposing the high-frequency texture enhancement data on an image obtained by enhancing the second image based on the first luminance related data; or when the scaling enhancement manner identifier is a seventh value, it indicates that the scaling enhancement manner is adjusting, based on the tone mapping curve for scaled display, luminance of an image obtained by enhancing the second image based on the first luminance related data.

In this embodiment of this application, the first value and the second value are different. The third value and the fourth value are different. The fifth value, the sixth value, and the seventh value are all different. In some scenarios, repeated values may exist in the first value, the second value, the third value, the fourth value, the fifth value, the sixth value, and the seventh value. For example, the first value is the same as the third value. The fourth value is the same as the fifth value. This is not specifically limited in embodiments of this application.

In some embodiments, when the transmission data includes the scaling enhancement data and the high-frequency texture enhancement data, the scaling enhancement data and the high-frequency texture enhancement data may be encoded into a same JPEG image frame, or may be encoded into different JPEG image frames.

For example, the JPEG file includes a first JPEG image frame and a third JPEG image frame. The first JPEG image frame is used to carry the image data of the second image and the tone mapping curve for scaled display. The third JPEG image frame is used to carry the scaled display data (the scaling enhancement data and/or the high-frequency texture enhancement data).

For example, an HDR image format corresponding to the JPEG file may be shown in Table 5-1. In Table 5-1, for example, the second image is an 8-bit SDR image. The first image is a 12-bit image. The data of the second image is encoded into the first JPEG image frame shown in Table 5-1. The scaled display data is encoded into the third JPEG image frame shown in Table 5-1.

TABLE 5-1

| JPEG file of an image | SOI | start of frame | 8-bit SDR image (First JPEG image frame) |
| | APP0 | Application Marker (JFIF) | |
| | APPn | Related data of a second image | |
| | DQT | Quantization Table | |
| | DHT | Haffman table | |
| | DRI | Restart interval | |
| | SOF | Frame header | |
| | SOS | scan header | |
| | EOI | end of frame | |
| | SOI | start of frame | Scaled display data (Third JPEG image frame) |
| | APPn | Scaled display enhancement information | |
| | DQT | Quantization Table | |
| | DHT | Haffman table | |
| | DRI | Restart interval | |
| | SOF | Frame header | |
| | SOS | scan header | |
| | EOI | end of frame | |

In an example, for description of bitstream syntax of an APPn field of the first JPEG image frame, refer to Table 5-2. For description of bitstream syntax of an APPn field of the third JPEG image frame, refer to Table 5-3. Certainly, the bitstream syntax of the APPn field of the first JPEG image frame may include more or less bitstream syntax than that in Table 5-2, and the bitstream syntax of the APPn field of the third JPEG image frame may include more or less bitstream syntax than that in Table 5-3. This is not limited in embodiments of this application.

TABLE 5-2

| | Descriptor |
| --- | --- |
| APPn_( ){ | |
| start_code | 0xFFEn |
| length | u(16) |
| ITUT35_tag | u(8)*6 |
| itu_t_t35_country_code | u(8) |
| if(itu_t_t35_country_code!=0xFF){ | |
| itu_t_t35_country_code extension byte | u(8) |
| } | |
| terminal_provide_code | u(16) |
| terminal_provide_oriented_code | u(16) |
| frame_number | 2 |
| File_type | 1 |
| meta_type | u(8) |
| enhence_type | u(8) |
| HDR_type | 3 |

TABLE 5-2-continued

| | Descriptor |
| --- | --- |
| frame offset[0] | u(32) |
| if(HDR_type==3){ | |
| HDR_scale_metedata_size | u(16) |
| HDR_scale_metedata( ) | |
| } | |
| } | |

HDR_scale_metedata_size may be a 16-bit unsigned integer, and indicates a total data size of the tone mapping curve for scaled display. HDR_scale_metedata( ) indicates the tone mapping curve for scaled display.

TABLE 5-3

| | Descriptor |
| --- | --- |
| APPn_( ){ | |
| start code | 0xFFEn |
| length | u(16) |
| ITU35_tag | u(8)*6 |
| itu_t_t35_country_code | u(8) |
| if(itu_t_t35_country_code!=0xFF){ | |
| itu_t_t35_country_code extension byte | u(8) |
| } | |
| terminal_provide_code | u(16) |
| terminal_provide_oriented_code | u(16) |
| frame_number | 2 |
| File_type | 3 |
| meta_type | u(8) |
| enhence_type | u(8) |
| HDR_type | 1 or 2 |
| } | |

Example 6

In some scenarios, other data included in the transmission data than the image data of the second image may be determined based on an actual situation. In addition to the image data of the second image, the transmission data may include one or more of the following: the first luminance related data, at least one tone mapping curve, and scaled display data. Which data is included may be indicated by different syntax elements. The scaled display data may include scaling enhancement data, high-frequency texture enhancement data, and a tone mapping curve for scaled display.

In an example, the transmission data includes the first luminance related data, the scaling enhancement data, and the high-frequency texture enhancement data. The first luminance related data, the scaling enhancement data, and the high-frequency texture enhancement data are independently encoded into different JPEG image frames. The JPEG file includes a first JPEG image frame, a second JPEG image frame, a third JPEG image frame, and a fourth image frame. The first JPEG image frame is used to carry the image data of the second image and the tone mapping curve for scaled display, the second JPEG image frame is used to carry the first luminance related data, the third JPEG image frame is used to carry the scaling enhancement data, and the fourth image frame is used to carry the high-frequency texture enhancement data.

For example, an HDR image format corresponding to the JPEG file may be shown in Table 6-1.

TABLE 6-1

| JPEG file | SOI | start of frame | 8-bit SDR image |
|---|---|---|---|
| (Transmission | APP0 | JFIF | |
| data of a | APPn | Application identifier field | |
| second image) | DQT | Quantization Table | |
| | DHT | Haffman table | |
| | DRI | Restart interval | |
| | SOF | Frame header | |
| | SOS | scan header | |
| | EOI | end of frame | |
| | SOI | start of frame | First luminance |
| | APPn | Application identifier field | related data |
| | DQT | Quantization Table | |
| | DHT | Haffman table | |
| | DRI | Restart interval | |
| | SOF | Frame header | |
| | SOS | scan header | |
| | EOI | end of frame | |
| | SOI | start of frame | Scaling |
| | APPn | Application identifier field | enhancement |
| | DQT | Quantization Table | data |
| | DHT | Haffman table | |
| | DRI | Restart interval | |
| | SOF | Frame header | |
| | SOS | scan header | |
| | EOI | end of frame | |
| | SOI | start of frame | High-frequency |
| | APPn | Application identifier field | texture |
| | DQT | Quantization Table | enhancement |
| | DHT | Haffman table | data |
| | DRI | Restart interval | |
| | SOF | Frame header | |
| | SOS | scan header | |
| | EOI | end of frame | |

In an example, for description of bitstream syntax of an APPn field of the first JPEG image frame, refer to Table 6-2. Certainly, the bitstream syntax of the APPn field of the first JPEG image frame may include more or less bitstream syntax than that in Table 6-2. This is not limited in embodiments of this application.

TABLE 6-2

| | Descriptor |
|---|---|
| APPn_( ){ | |
| start_code | 0xFFEn |
| length | u(16) |
| ITU35_tag | u(8)*6 |
| itu_t_t35_country_code | 0x26 |
| if(itu_t_t35_country_code!=0xFF){ | |
| itu_t_t35_country_code extension byte | u(8) |
| } | |
| terminal_provide_code | 0x04 |
| terminal_provide_oriented_code | 0x07 |
| frame_number | 4 |
| File_type | 1 |
| meta_type | 2 |
| enhence_type | 2 |
| HDR_type | 3 |
| for(i=0,i<frame number−1,i++){ | |
| frame offset[i] | u(32) |
| } | |
| if(meta_type==2){ | |
| HDR metadata both size | u(16) |
| HDR metadata( ) | |
| HDR metadata enhence( ) | |
| }else if(meta_type==1){ | |
| HDR metadata size | u(16) |
| HDR metadata( ) | |
| } | |
| if(enhence_type==1){ | |
| enhence info size | u(16) |
| enhence info( ) | |
| } | |
| elseif(enhence_type==2){ | |

TABLE 6-2-continued

| | Descriptor |
|---|---|
| enhence metadata size | u(16) |
| enhence metadata( ) | |
| } | |
| elseif(enhence_type==3){ | |
| HDR scale metadata size | u(16) |
| HDR scale metadata ( ) | |
| } | |
| } | |

In an example, for description of a bitstream syntax of an APPn field of the second JPEG image frame, refer to Table 6-3. Certainly, the bitstream syntax of the APPn field of the second JPEG image frame may include more or less bitstream syntax than that in Table 6-3. This is not limited in embodiments of this application.

TABLE 6-3

| | Descriptor |
|---|---|
| APPn_( ){ | |
| start code | 0xFFEn |
| length | u(16) |
| ITU35 tag | u(8)*6 |
| itu_t_t35_country_code | 0x26 |
| if(itu_t_t35_country_code!=0xFF){ | |
| itu_t_t35_country_code_extension_byte | u(8) |
| } | |
| terminal_provide_code | 0x04 |
| terminal_provide_oriented_code | 0x07 |
| frame_number | 4 |
| File_type | 2 |
| meta_type | 0 |
| enhence_type | 1 |
| HDR_type | 0 |
| for(i=0,i<frame number−1,i++){ | |
| frame offset[i] | |
| } | |
| if(enhence_type ==1) | |
| enhence info size | u(16) |
| enhence info( ) | |
| } | | meta_type==0 indicates default and no transmission HDR_type==0 indicates default and no transmission.

In an example, for description of a bitstream syntax of an APPn field of the third JPEG image frame, refer to Table 6-4. Certainly, the bitstream syntax of the APPn field of the third JPEG image frame may include more or less bitstream syntax than that in Table 6-4. This is not limited in embodiments of this application.

TABLE 6-4

| | Descriptor |
|---|---|
| APPn_( ){ | |
| start code | 0xFFEn |
| length | u(16) |
| ITU35_tag | u(8)*6 |
| itu_t_t35_country_code | 0x26 |
| if(itu_t_t35_country_code!=0xFF){ | |
| itu_t_t35_country_code extension byte | u(8) |
| } | |
| terminal_provide_code | 0x04 |
| terminal_provide_oriented_code | 0x07 |
| frame_number | 4 |
| File_type | 3 |

TABLE 6-4-continued

|  | Descriptor |
|---|---|
| meta_type | 0 |
| enhence_type | 0 |
| HDR_type | 1 |
| } | | meta_type=0 indicates default and no transmission enhence_type=0 indicates default and no transmission.

In an example, for description of a bitstream syntax of an APPn field of the fourth image frame, refer to Table 6-5. Certainly, the bitstream syntax of the APPn field of the fourth image frame may include more or less bitstream syntax than that in Table 6-5. This is not limited in embodiments of this application.

TABLE 6-5

|  | Descriptor |
|---|---|
| APPn_( ){ | |
| start code | 0xFFEn |
| length | u(16) |
| ITU35_tag | u(8)*6 |
| itu_t_t35_country_code | 0x26 |
| if(itu_t_t35_country_code!=0xFF){ | |
| itu_t_t35_country_code extension byte | u(8) |
| } | |
| terminal_provide_code | 0x04 |
| terminal_provide_oriented_code | 0x07 |
| frame_number | 4 |
| File_type | 3 |
| meta_type | 0 |
| enhence_type | 0 |
| HDR_type | 2 |
| } | | meta_type=0 indicates default and no transmission enhence_type=0 indicates default and no transmission.

In the foregoing solution, in the capture and processing phase, a capture end device generates, based on screen information used by the capture end, a TM curve used in other possible screen luminance, to maintain a dynamic range viewed at the capture end. At the same time, screen related information of the capture end is recorded to guide a backlight increase rate during display, so that consistency between display effect of the display end device and display effect of the capture end is improved as much as possible.

Figure 5A:
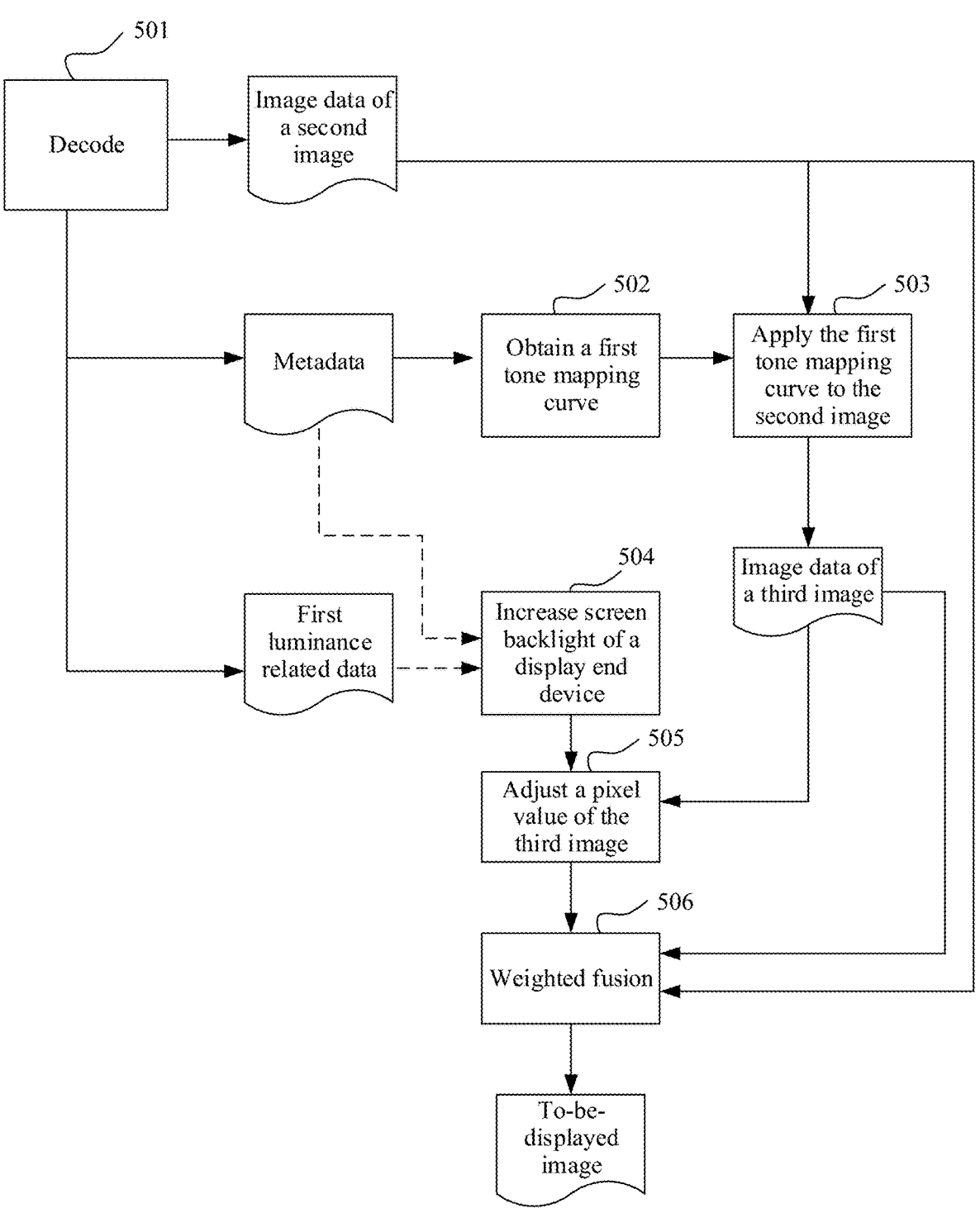
FIG. 5A is a schematic flowchart of an image display method performed by a display end device according to an embodiment of this application.

The following describes a procedure of a method for obtaining a to-be-displayed image by a display end device, as shown in FIG. 5A.

501: The display end device decodes transmission data of the second image to obtain image data of a second image and first luminance related data.

In some embodiments, the transmission data may further include at least one tone mapping curve and/or screen related information. In this case, the display end device further decodes the transmission data to obtain the at least one tone mapping curve and/or the screen related information.

For example, the display end device receives a bitstream, and obtains the image data of the second image and the first luminance related data from the bitstream.

In some scenarios, the transmission data further includes other data. In this case, the display end device further decodes the bitstream to obtain the other data.

In a possible implementation, the bitstream includes a JPEG file. The JPEG file includes a first JPEG image frame, the first JPEG image frame carries encoded data of the second image, and the first luminance related data is carried in an application identifier APP field of the first JPEG image frame. In this case, the display end device may decode the JPEG image frame to obtain the second image and decode the APP field of the JPEG image frame to obtain the first luminance related data. For example, bitstream syntax during decoding may be shown in Table 1-2 and Table 1-3, or may be shown in Table 3-1 and Table 1-3.

In another possible implementation, the bitstream includes a JPEG file, and the JPEG file includes a first JPEG image frame and a second JPEG image frame. The display end device decodes the first JPEG image frame to obtain the second image, and decodes the second JPEG image frame to obtain the first luminance related data. For example, bitstream syntax during decoding may be shown in Table 3-1 and Table 2-3.

In still another possible implementation, the transmission data further includes scaling enhancement data. Scaled display data includes at least one of the following: the scaling enhancement data, high-frequency texture enhancement data, or a tone mapping curve for scaled display, the scaling enhancement data includes information for describing an increased pixel value of a scale-up image of a first image compared with the first image or information for describing a reduced pixel value of a scale-down image of a first image compared with the first image, and the high-frequency texture enhancement data includes information for describing increased high-frequency texture of the scale-up image of the first image compared with the first image and/or information for describing reduced high-frequency texture of the scale-down image of the first image compared with the first image.

In one case, the scaling enhancement data is carried in an APP field of the first JPEG image frame. The display end device may further decode the APP field of the first JPEG image frame to obtain the scaling enhancement data.

In another case, when the scaled display data includes the tone mapping curve for scaled display, the tone mapping curve for scaled display is carried in an APP field of the first JPEG image frame; when the scaled display data includes the scaling enhancement data, the JPEG file further includes a third JPEG image frame, and the third JPEG image frame carries the scaling enhancement data; or when the scaled display data includes the high-frequency texture enhancement data, the JPEG file further includes a fourth JPEG image frame, and the fourth JPEG image frame carries the high-frequency texture enhancement data.

502: The display end device obtains a first tone mapping curve from the at least one tone mapping curve of the metadata, where the first tone mapping curve matches a screen display parameter of the display end device. For ease of description, a matched tone mapping curve is referred to as the first tone mapping curve in this embodiment of this application. For example, the at least one tone mapping curve includes three tone mapping curves, including: a tone mapping curve 1 corresponding to a 1000-nit screen and a 500-nit screen, a tone mapping curve 2 corresponding to a 1000-nit screen and a 200-nit screen, and a tone mapping curve 3 corresponding to a 1000-nit screen and a 100-nit screen. For example, the screen display parameter of the display end device is 500 nits. In this case, the display end device matches the tone mapping curve 1 of the three tone mapping curves.

For example, the at least one tone mapping curve is carried in an application identifier APP field of the JPEG image frame. In this case, the display end device may decode the metadata of the application identifier APP field of the JPEG image frame to obtain the at least one tone mapping curve.

For another example, the screen display parameter of the display end device is 600 nits. Because there is no 600-nit tone mapping curve, a 600-nit tone mapping curve may be obtained by performing interpolation on the 500-nit tone mapping curve.

In the foregoing solution, the display end generates, based on the TM curve transmitted by a capture end, a TM curve adapted to the display end device, and applies the TM curve to an image, so that image effect viewed by a user on various luminance screens is as consistent as possible with effect of the capture end on a reference screen.

503: Apply the first tone mapping curve to the second image. For example, the following Equation (2) may be applied to the second image to obtain image data of a third image. For example, the image data includes an R component, a G component, and a B component of a pixel.

$$gain = \frac{LUT[in\ Y]}{in\ Y} \qquad \text{Equation (2)}$$
$$out\ R = in\ R * gain$$
$$out\ G = in\ G * gain$$
$$out\ B = in\ B * gain$$

inY indicates backlight luminance of a display, LUT indicates the first tone mapping curve, and LUT [inY] indicates backlight luminance mapped by the backlight luminance of the display in the first tone mapping curve. Gain indicates a pixel value adjustment gain. inR indicates a before-adjustment R component of a pixel, outR indicates an after-adjustment R component of a pixel, inG indicates a before-adjustment G component of a pixel, outG indicates an after-adjustment G component of a pixel, inB indicates a before-adjustment B component of a pixel, and outB indicates an after-adjustment B component of a pixel.

504: Increase screen backlight of the display end device. In a possible implementation, the display end device may determine, based on screen related information obtained through decoding, increased screen backlight of the display end device. For example, the screen related information includes a screen backlight parameter of a capture end device, a mapping relationship between backlight luminance under a screen backlight parameter of a capture end device and backlight luminance under at least one specified screen backlight parameter, or an adjustment ratio of backlight luminance under at least one specified screen backlight parameter to backlight luminance under a screen backlight parameter of a capture end device. As described herein, the screen backlight of the display end device is increased, so that luminance of an image is increased.

The display end device may determine a backlight luminance increase ratio of the display end device based on the screen related information. Then, the increased backlight luminance is determined based on the current backlight luminance and the increase ratio. The current backlight luminance of the display end device is represented by BL0. The increased backlight luminance is represented by BL1.

For example, the increased backlight luminance and the non-increased backlight luminance may meet the condition shown in the following Equation (3).

$$BL1 = U * BL0 \qquad \text{Equation (3)}$$

In an example, the display end device may determine the increase ratio U based on the screen backlight parameter of the capture end device and a screen backlight parameter of the display end device. For example, U=screen backlight parameter of the capture end device/screen backlight parameter of the display end device.

For another example, U=a*screen backlight parameter of the capture end device/screen backlight parameter of the display end device+q. a and q may be determined based on empirical values. Values of a and q may be configured in the display end device.

In another example, the display end device may determine the increase ratio U based on the mapping relationship between the backlight luminance under the screen backlight parameter of the capture end device and the backlight luminance under the at least one specified screen backlight parameter. The at least one specified screen backlight parameter is searched for a specified screen backlight parameter 1 matching the screen backlight parameter of the display end device. Then, a ratio of the backlight luminance under the screen backlight parameter of the capture end device to backlight luminance under the specified screen backlight parameter 1 is obtained as U.

In still another example, the display end device may determine U based on an adjustment ratio of the backlight luminance under the at least one specified screen backlight parameter to the backlight luminance under the screen backlight parameter of the capture end device. For example, the at least one specified screen backlight parameter is searched for a specified screen backlight parameter 1 matching the screen backlight parameter of the display end device. Then, an adjustment ratio of backlight luminance under the specified screen backlight parameter 1 to the backlight luminance under the screen backlight parameter of the capture end device is obtained as U.

In another possible implementation, the display end device may determine increased backlight luminance (which may also be referred to as screen backlight) based on the first luminance related data and current backlight luminance of the display end device.

For example, the increased screen backlight luminance meets the condition shown in any one of the following Equations (4) to (7).

$$BL1 = BL0 * (k1 * AVG(hdrlayer_i) + b1) \qquad \text{Equation (4)}$$
$$BL1 = BL0 * (k2 * \max(hdrlayer_i) + b2) \qquad \text{Equation (5)}$$
$$BL1 = BL0 * k1 * AVG(lhdrlayer_i) + b1 \qquad \text{Equation (6)}$$
$$BL1 = BL0 * k2 * \max(lhdrlayer_i) + b2 \qquad \text{Equation (7)}$$

BL1 indicates after-adjustment screen backlight of the display end device, BL0 indicates before-adjustment screen backlight (which may also be referred to as the backlight luminance) of the display end device, hdrlayer; indicates luminance increase data corresponding to an $i^{th}$ pixel of a display of the display end device, AVG(hdrlayer$_i$) indicates an average value of luminance increase data corresponding to pixels included in the display of the display end device, max(hdrlayer$_i$) indicates a maximum value of the luminance increase data corresponding to the pixels included in the display of the display end device, k1 and k2 are both positive numbers, and b1 and b2 are both positive numbers less than 1.

In some embodiments, different areas of the screen may have different backlight. In this case, screen backlight of an $L^{th}$ area may be represented by using any one of the following Equations (8) to (11).

$$BL1^L = BL0^L * \left(k3 * AVG(hdrlayer_i^L) + b3\right) \quad \text{Equation (8)}$$

$$BL1^L = BL0^L * \left(k4 * \max\left(hdrlayer_i^L\right) + b4\right) \quad \text{Equation (9)}$$

$$BL1^L = BL0^L * k3 * AVG\left(hdrlayer_i^L\right) + b3 \quad \text{Equation (10)}$$

$$BL1^L = BL0^L * k4 * \max\left(hdrlayer_i^L\right) + b4 \quad \text{Equation (11)}$$

$BL1^L$ indicates after-adjustment screen backlight of the $L^{th}$ area of the display end device, $BL0^L$ indicates before-adjustment screen backlight (which may also be referred to as backlight luminance) of the $L^{th}$ area of the display end device, $$hdrlayer_i^L$$

indicates luminance increase data corresponding to an $i^{th}$ pixel of the $L^{th}$ area of the display of the display end device, $$AVG(hdrlayer_i^L)$$

indicates an average value of luminance increase data corresponding to pixels included in the $L^{th}$ area of the display of the display end device, $$\max(hdrlayer_i^L)$$

indicates a maximum value of the luminance increase data corresponding to the pixels included in the $L^{th}$ area of the display of the display end device, k3 and k4 are both positive numbers, and b3 and b4 are both positive numbers less than 1.

In some embodiments, for a full array local dimming screen, backlight luminance of each image block may be adjusted. The screen backlight of the $L^{th}$ area may be represented by using the following Equation (12).

$$BL1^L = BL0^L * k5 * AVG(hdrlayer_i^L)/AVG(hdrlayer_i) + b5 \quad \text{Equation (12)}$$

$BL1^L$ indicates after-adjustment screen backlight of the $L^{th}$ area of the display end device, $BL0^L$ indicates before-adjustment screen backlight (which may also be referred to as backlight luminance) of the $L^{th}$ area of the display end device, $$hdrlayer_i^L$$

indicates luminance increase data corresponding to an $i^{th}$ pixel of the $L^{th}$ area of the display of the display end device, $$AVG(hdrlayer_i^L)$$

indicates an average value of luminance increase data corresponding to pixels included in the $L^{th}$ area of the display of the display end device, AVG(hdrlayer$_i$) indicates an average value of the luminance increase data corresponding to the pixels included in the display of the display end device, k5 is a positive number, and b5 is a positive number less than 1. In some scenarios, the foregoing AVG may alternatively be replaced with max.

In some embodiments, for an edge local dimming screen, backlight luminance of each image block may be adjusted. The screen backlight of the $L^{th}$ area may be represented by using the following Equation (13).

$$BL1^L = BL0^L * k6 * \quad \text{Equation (13)}$$
$$AVG(edgemap\_hdrlayer_i^L)/AVG(edgemap\_hdrlayer_i) + b6$$

$BL1^L$ indicates after-adjustment screen backlight of the $L^{th}$ area of the display end device, $BL0^L$ indicates before-adjustment screen backlight (which may also be referred to as backlight luminance) of the $L^{th}$ area of the display end device, $$hdrlayer_i^L$$

indicates luminance increase data corresponding to an $i^{th}$ pixel of the $L^{th}$ edge area of the display of the display end device, $$AVG(hdrlayer_i^L)$$

indicates an average value of luminance increase data corresponding to pixels included in the $L^{th}$ edge area of the display of the display end device, AVG(hdrlayer$_i$) indicates an average value of the luminance increase data corresponding to the pixels included in the display of the display end device, k6 is a positive number, and b6 is a positive number less than 1.

It should be noted that the luminance increase data may be at a pixel level or may be at an image block level. In this case, $$hdrlayer_i^L$$

is the luminance increase data of an $i^{th}$ image block included in the $L^{th}$ area. Division of image blocks may be the same as or different from division of screen areas.

505: Adjust a pixel value of the third image.

In a specific embodiment, the pixel value of the pixel of the third image may be adjusted based on the before-adjustment screen backlight of the display end device and the after-adjustment screen backlight of the display end device, to obtain a fourth image.

In some embodiments, a pixel value of each pixel of the fourth image meets the condition shown in the following Equation (14):

$$\text{pixel } 1_i = pow(BL0/BL1, 1/\text{gamma}) * \text{pixel } 0_i \qquad \text{Equation (14)}$$

pixel$1_i$ indicates a pixel value of an $i^{th}$ pixel of the fourth image, pixel$0_i$ indicates a pixel value of an $i^{th}$ pixel of the third image, BL0 indicates the before-adjustment screen backlight of the display end device, BL1 indicates the after-adjustment screen backlight of the display end device, gamma indicates a gamma value of the display end device, and pow(xExp, nExp) indicates the nExp$^{th}$ power of the base number xExp.

It should be noted that, in some scenarios, BL0 and BL1 may be at an area level. In this case, BL0 in Equation (14) may be understood as current (before-adjustment) backlight luminance of the area in which the $i^{th}$ pixel is located. BL1 may be understood as the after-adjustment backlight luminance of the area in which the $i^{th}$ pixel is located. In some scenarios, BL0 and BL1 may be at a screen level. In this case, the pixels correspond to same before-adjustment backlight luminance, and the pixels also correspond to same after-adjustment backlight luminance.

506: Perform weighted fusion on the third image and the fourth image to obtain the to-be-displayed image.

For example, a weight of a pixel of the third image and a weight of a pixel of the fourth image are determined based on the first luminance related data.

For example, a pixel value of each pixel of the to-be-displayed image meets the condition shown in the following Equation (15):

$$\text{weight}_i = hdrlayer_i/(2^N - 1), \text{ and} \qquad \text{Equation (15)}$$
$$\text{pixel}_i = \text{pixel } 0_i * \text{weight}_i + \text{pixel } 1_i * (1 - \text{weight}_i)$$

N indicates a quantity of bits of the second image, hdrlayer; indicates first luminance related data corresponding to an $i^{th}$ pixel, pixel$1_i$ indicates a pixel value of an $i^{th}$ pixel of the fourth image, pixel$0_i$ indicates a pixel value of an $i^{th}$ pixel of the third image, and pixel $_i$ indicates the pixel value of each pixel of the to-be-displayed image.

In a currently applied solution, during encoding, the capture end device encodes only the image data without recording screen information used during effect debugging of the capture end or considering screen information that may be used by the display end. Provided that a screen used by the capture end is inconsistent with a screen used by the display end, effect viewed at the display end and content to be shown at the capture end are different and have a specific deviation. The display end device directly displays the image data without considering the difference between the current screen luminance and the screen luminance used by the capture end, and does not perform corresponding adaptation. As a result, effect is not optimal. However, in this embodiment of this application, the display end increases luminance of the display based on luminance related data, metadata, and the like that are transmitted by the capture end, adjusts a pixel value of an image to remain luminance perceived by human eyes unchanged, and determines a weight based on the luminance related data to weight an image before pixel value adjustment and an image after pixel value adjustment, so that a relative light-dark relationship of a real scene is presented as much as possible.

In the display phase of the display, the screen backlight may be adjusted based on the luminance related data and a local light control screen, to increase luminance in a bright area and reduce luminance in a dark area, so that the luminance perceived by human eyes remains unchanged, details are not affected, and the relative light-dark relationship of the real scene is presented as much as possible.

For example, FIG. 5B is a schematic flowchart of adjusting the screen backlight of the display end device. The display end device determines the to-be-displayed image. For a specific determining process, refer to the description of the embodiment shown in FIG. 5A. Details are not described herein again. The display end device controls the screen backlight of the display of the display end device based on the first luminance related data. For example, local backlight adjustment may be performed based on a type of the display. The after-adjustment backlight parameter of the display may be determined in any possible manner of the foregoing Equation (3) to Equation (13).

In some embodiments, the transmission data further includes the scaled display data. If the user performs a scale-up or scale-down operation on the to-be-displayed image, the display end may perform enhancement on the to-be-displayed image based on the scaled display data obtained through decoding.

In an example, the scaled display data includes the scaling enhancement data, and the scaling enhancement data includes the information for describing the increased pixel value of the scale-up image of the first image compared with the first image. If the user performs the scale-up operation on the to-be-displayed image, the display end device performs enhancement on the to-be-displayed image based on the scaling enhancement data. For example, the scaling enhancement data is superimposed on the to-be-displayed image.

In an example, the scaled display data includes the scaling enhancement data, and the scaling enhancement data includes the information for describing the reduced pixel value of the scale-down image of the first image compared with the first image. If the user performs the scale-up operation on the to-be-displayed image, the display end device performs adjustment on the to-be-displayed image based on the scaling enhancement data. For example, the scaling enhancement data is subtracted from the to-be-displayed image.

In an example, the scaled display data includes the high-frequency texture enhancement data, and the high-frequency texture enhancement data includes the information for describing the increased high-frequency texture of the scale-up image of the first image compared with the first image. If the user performs the scale-up operation on the to-be-displayed image, the display end device performs enhancement on the to-be-displayed image based on the high-frequency texture enhancement data, for example, enhancing the high-frequency texture enhancement data based on a specified enhancement coefficient, and superimposing enhanced high-frequency texture enhancement data on the to-be-displayed image to obtain an enhanced to-be-displayed image.

In an example, the scaled display data includes the high-frequency texture enhancement data, and the high-frequency texture enhancement data includes the information for describing the reduced high-frequency texture of the scale-down image of the first image compared with the first image. If the user performs the scale-down operation on the to-be-displayed image, the display end device performs adjustment on the to-be-displayed image based on the high-frequency texture enhancement data, for example, performing negative enhancement on the high-frequency texture enhancement data based on a specified enhancement coefficient, and superimposing high-frequency texture enhancement data obtained through negative enhancement on the to-be-displayed image to obtain an enhanced to-be-displayed image.

For example, the scaled display data is carried in the JPEG image frame for carrying the encoded data of the second image. The display end device may further decode the JPEG file to obtain the scaled display data. In response to the scale-up or scale-down operation performed by the user on the to-be-displayed image, the display end device performs enhancement on the to-be-displayed image based on the scaled display data to obtain the enhanced to-be-displayed image.

For another example, the scaled display data is carried in the third JPEG image frame of the JPEG file. The display end device decodes the third JPEG image frame to obtain the scaling enhancement data, and in response to the scale-up or scale-down operation performed by the user on the to-be-displayed image, performs enhancement on the to-be-displayed image based on the scaling enhancement data to obtain the enhanced to-be-displayed image.

In some embodiments, the APP field of the first JPEG image frame (SDR image data) further includes a scaling enhancement manner identifier; and when the scaling enhancement manner identifier is a fifth value, it indicates that a scaling enhancement manner is superimposing the scaling enhancement data; when the scaling enhancement manner identifier is a sixth value, it indicates that a scaling enhancement manner is weighted superimposing the high-frequency texture enhancement data; or when the scaling enhancement manner identifier is a seventh value, it indicates that a scaling enhancement manner is adjusting, based on the tone mapping curve for scaled display, luminance of an image obtained by enhancing the second image based on the first luminance related data.

The performing enhancement on the to-be-displayed image based on the scaling enhancement data to obtain the enhanced to-be-displayed image includes:

when the scaling enhancement manner identifier is the fifth value, superimposing the scaling enhancement data on the to-be-displayed image to obtain the enhanced to-be-displayed image;

when the scaling enhancement manner identifier is the sixth value, enhancing the high-frequency texture enhancement data based on a specified enhancement coefficient, and superimposing enhanced high-frequency texture enhancement data on the to-be-displayed image to obtain the enhanced to-be-displayed image; or when the scaling enhancement manner identifier is the seventh value, adjusting a luminance value of the to-be-displayed image based on the tone mapping curve for scaled display to obtain an adjusted to-be-displayed image.

For example, the scaling enhancement manner identifier is represented by an element HDR_type.

When HDR_type is 1, data obtained by decoding the JPEG frame is JPEG_scale1[ ] (namely, the scaling enhancement data), and an HDR scaled image HDR_scale[ ] is obtained from a path. In this case, the final scaled display data HDR_scale_display[ ] is:

HDR_scale_display[ ]=HDR_scale[ ]+JPEG_scale1[ ].

In this embodiment of this application, the HDR scaled image HDR_scale[ ] obtained from the path may be an HDR image obtained by processing an SDR image, and may be, for example, an image obtained by processing the second image based on the first luminance related data.

When HDR_type is 2, data obtained by decoding the JPEG frame is JPEG_scale2[ ] (namely, the high-frequency texture enhancement data), and an HDR scaled image HDR_scale[ ] is obtained from a path. In this case, the final scaled display data HDR_scale_display[ ] is:

HDR_scale_display[ ]=HDR_scale[ ]−JPEG_scale2[ ]+A*JPEG_scale2[ ].

In some embodiments, A may be determined based on a preset value and current backlight of a display device. A may alternatively be carried by a transmit end device in metadata and sent to the display end device.

When HDR_type is 3, data obtained by decoding the JPEG frame is JPEG_scale_lut[ ], and an HDR scaled image obtained from a path is HDR_scale_display[ ]. In this case, the final scaled display data HDR_scale_display3[ ] is:

HDR_scale_display3.R[ ]=HDR_scale_display.R*JPEG_scale_lut[HDR_scale_display.MAXRGB[ ]]

HDR_scale_display3.G[ ]=HDR_scale_display.G*JPEG_scale_lut[HDR_scale_display.MAXRGB[ ]]

HDR_scale_display3.B[ ]=HDR_scale_display.B*JPEG_scale_lut[HDR_scale_display.MAXRGB[ ]]

HDR_scale_display indicates image frame data of the to-be-displayed image. HDR_scale_display.MAXRGB[ ] indicates image frame data obtained by processing HDR_scale_display. Each pixel value in an image frame of HDR_scale_display.MAXRGB[ ] is equal to a maximum component value in RGB component values of each pixel in HDR_scale_display.

JPEG_scale_lut[ ] indicates a tone mapping curve corresponding to the scale-up image of the first image. Luminance obtained by mapping a luminance value of each pixel in the processed image frame data or a multiple of luminance increase or decrease relative to luminance of each pixel in the processed image frame data is obtained by querying through JPEG_scale_lut[ ].

The following describes in detail a procedure of an image decoding method provided in an embodiment of this application.

FIG. 6 is a schematic flowchart of an image decoding method according to an embodiment of this application.

601: Receive a bitstream, where the bitstream includes a joint graphic experts group JPEG file encoded in a JPEG format.

602: Decode the JPEG file to obtain image data of a second image and first luminance related data, where the image data of the second image is obtained by compressing image data of a first image, a quantity of bits of the first image is greater than a quantity of bits of the second image, the first luminance related data is used to represent a luminance mapping relationship between the first image and the second image, and the first luminance related data is used to perform enhancement on the image data of the second image.

In some embodiments, a processor in a capture end device may perform enhancement on the image data of the second image based on the first luminance related data to obtain a to-be-displayed image.

In some embodiments, the JPEG file includes a first JPEG image frame, the first JPEG image frame carries the image data of the second image, and the first luminance related data is carried in an application identifier APP field of the first JPEG image frame. Further, the decoding the JPEG file to obtain image data of a second image and first luminance related data may be implemented in the following manner:

decoding the first JPEG image frame to obtain the image data of the second image, and obtaining the first luminance related data from the APP field of the first JPEG image frame.

In some embodiments, an encoder may further send at least one tone mapping curve to a decoder. The at least one tone mapping curve is determined based on a screen backlight parameter of the capture end device, the image data of the second image, and at least one specified screen backlight parameter, and the at least one specified screen backlight parameter is different from the screen backlight parameter of the capture end device. Therefore, a decoding apparatus further decodes the application identifier APP field of the first JPEG image frame to obtain the at least one tone mapping curve.

In some embodiments, when performing enhancement on the image data of the second image based on the first luminance related data, the processor in the capture end device may determine a first tone mapping curve from the at least one tone mapping curve based on a screen display parameter of a display end device, where the screen display parameter of the display end device matches a specified screen display parameter corresponding to the first tone mapping curve; perform tone mapping on the second image based on the first tone mapping curve to obtain a third image; and adjust a pixel value of a pixel of the third image based on the first luminance related data to obtain the to-be-displayed image.

In some embodiments, the image data of the second image and the first luminance related data are separately encoded. The JPEG file includes a first JPEG image frame and a second JPEG image frame, the first JPEG image frame carries the image data of the second image, and the second JPEG image frame carries the first luminance related data.

Further, a decoding apparatus decodes the first JPEG image frame to obtain the image data of the second image, and decodes the second JPEG image frame to obtain the first luminance related data.

In some embodiments, the at least one tone mapping curve may be carried in an application identifier APP field of the second JPEG image frame or an APP field of the first JPEG image frame. The decoding apparatus may decode the application identifier APP field of the first JPEG image frame or the APP field of the second JPEG image frame to obtain the at least one tone mapping curve.

In some embodiments, the JPEG file further includes scaled display data through encoding. The decoding apparatus also decodes the JPEG file to obtain the scaled display data. The scaled display data includes at least one of the following: scaling enhancement data, high-frequency texture enhancement data, or a tone mapping curve for scaled display, the scaling enhancement data includes information for describing an increased pixel value of a scale-up image of the first image compared with the first image or information for describing a reduced pixel value of a scale-down image of the first image compared with the first image, and the high-frequency texture enhancement data includes information for describing increased high-frequency texture of the scale-up image of the first image compared with the first image and/or information for describing reduced high-frequency texture of the scale-down image of the first image compared with the first image.

In some embodiments, the scaled display data is carried in the APP field of the first JPEG image frame, and the decoding the JPEG file to obtain the scaled display data includes:

decoding the APP field of the first JPEG image frame to obtain the scaled display data.

In some embodiments, when the scaled display data includes the tone mapping curve for scaled display, the tone mapping curve for scaled display is encoded into the APP field of the first JPEG image frame. The decoding apparatus may decode the APP field of the first JPEG image frame to obtain the tone mapping curve for scaled display.

When the scaled display data includes the scaling enhancement data, the JPEG file further includes a third JPEG image frame, the third JPEG image frame carries the scaling enhancement data, and the decoding apparatus may decode the third JPEG image frame to obtain the scaling enhancement data.

When the scaled display data includes the high-frequency texture enhancement data, the JPEG file further includes a fourth JPEG image frame, the fourth JPEG image frame carries the high-frequency texture enhancement data, and the decoding apparatus may decode the fourth JPEG image frame to obtain the high-frequency texture enhancement data.

In some embodiments, the APP field of the first JPEG image frame further includes a second location identifier and/or a third location identifier, the second location identifier indicates a start location of the third JPEG image frame in the JPEG file, and the third location identifier indicates a start location of the fourth JPEG image frame in the JPEG file. The decoding apparatus may determine the start location of the third JPEG image frame from the JPEG file based on the second location identifier, and decode the third JPEG image frame to obtain the scaling enhancement data based on the start location; or the decoding apparatus may determine the start location of the fourth JPEG image frame from the JPEG file based on the third location identifier, and decode the fourth JPEG image frame to obtain the scaling enhancement data based on the start location.

In some embodiments, the APP field of the first JPEG image frame further includes a scaling enhancement manner identifier; and when the scaling enhancement manner identifier is a fifth value, it indicates that a scaling enhancement manner is superimposing the scaling enhancement data; when the scaling enhancement manner identifier is a sixth value, it indicates that a scaling enhancement manner is weighted superimposing the high-frequency texture enhancement data; or when the scaling enhancement manner identifier is a seventh value, it indicates that a scaling enhancement manner is adjusting, based on the tone mapping curve for scaled display, luminance of an image obtained by enhancing the second image based on the first luminance related data.

In some embodiments, when the scaling enhancement manner identifier is the fifth value, the scaling enhancement data is obtained by decoding the JPEG file. When the scaling enhancement manner identifier is the sixth value, the high-frequency texture enhancement data is obtained by decoding the JPEG file. When the scaling enhancement manner identifier is the seventh value, the tone mapping curve for scaled display is obtained by decoding the JPEG file.

The scaling enhancement data, the high-frequency texture enhancement data, and the tone mapping curve for scaled display are used to perform enhancement on a scale-up to-be-displayed image when an operation of scaling up the to-be-displayed image is performed.

Figure 7:
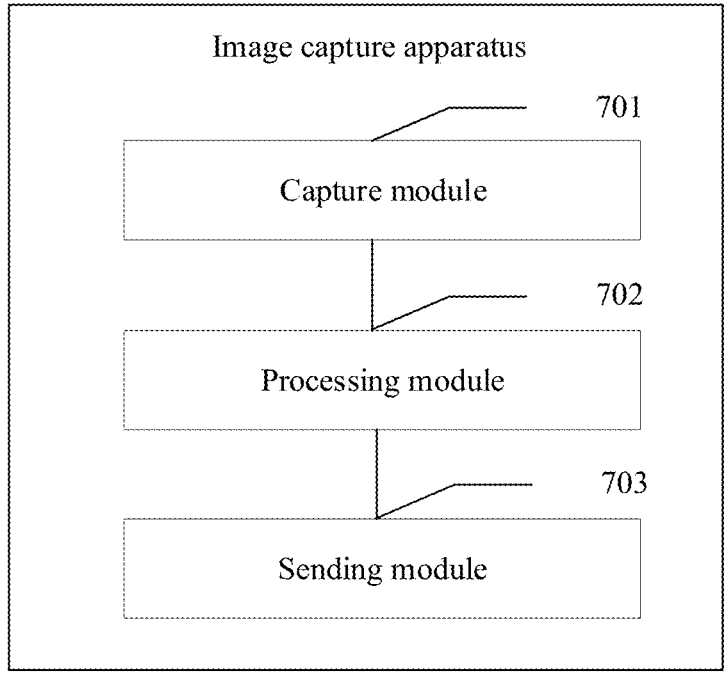
FIG. 7 is a diagram of an image capture apparatus according to an embodiment of this application.

According to a concept that is the same as that of the foregoing method, an embodiment of this application provides an image capture apparatus, applied to a capture end device, as shown in FIG. 7.

A capture module 701 is configured to capture a first image to obtain image data of the first image.

A processing module 702 is configured to: perform compression on the first image based on the image data of the first image to obtain image data of a second image, where a quantity of bits of the first image is greater than a quantity of bits of the second image; and obtain transmission data of the second image based on the image data of the first image and the image data of the second image, where the transmission data of the second image includes encoded data of the second image and first luminance related data, and the first luminance related data is used to represent a luminance mapping relationship between the first image and the second image.

A sending module 703 is configured to send the transmission data.

In a possible implementation, the transmission data further includes at least one tone mapping curve, the at least one tone mapping curve is determined based on a screen backlight parameter of the capture end device, the image data of the second image, and at least one specified screen backlight parameter, and the at least one specified screen backlight parameter is different from the screen backlight parameter of the capture end device.

In a possible implementation, the processing module 702 is configured to: separately perform normalization on the image data of the first image and the image data of the second image based on the quantity of bits of the first image and the quantity of bits of the second image, to obtain normalized data of the first image and normalized data of the second image; and obtain the first luminance related data based on the normalized data of the first image and the normalized data of the second image.

In a possible implementation, the quantity of bits of the first image is N, the quantity of bits of the second image is M, a range of the normalized data of the first image is 0-X, a range of the normalized data of the second image is 0-Y, and $Y/X=2^{M-N}$.

In a possible implementation, the processing module 702 is configured to generate the first luminance related data based on ratios of normalized data of pixels in the first image to normalized data of the corresponding pixeles in the second image.

In a possible implementation, the processing module 702 is configured to: obtain the ratios of the normalized data of the pixels in the first image to the normalized data of the corresponding pixels in the second image; and when a ratio of normalized data of a first pixel of the first image to normalized data of the first pixel of the second image is less than 1, modify the ratio of the normalized data of the first pixel to obtain the first luminance related data, where the first pixel is a pixel of the first image or the second image.

In a possible implementation, the processing module 702 is configured to: generate second luminance related data based on ratios of normalized data of pixels in the first image to normalized data of the corresponding pixeles in the second image; and identify a specified highlighted object included in the first image, and adjust, based on an optical electro conversion curve, a luminance mapping relationship that is of a pixel corresponding to the highlighted object and that is in the second luminance related data to obtain the first luminance related data.

In a possible implementation, the processing module 702 is configured to: obtain the ratios of the normalized data of the pixels in the first image to the normalized data of the corresponding pixels in the second image; and when a ratio of normalized data of a first pixel of the first image to normalized data of the first pixel of the second image is less than 1, modify the ratio of the normalized data of the first pixel to obtain the second luminance related data, where the first pixel is a pixel of the first image or the second image.

In a possible implementation, the optical electro conversion curve includes at least one of the following: a perceptual quantizer PQ conversion curve, a hybrid log-gamma HLG conversion curve, or a scene luminance fidelity SLF conversion curve.

In a possible implementation, the first luminance related data is carried in metadata of the second image.

In a possible implementation, the first luminance related data, the screen related information, and the at least one tone mapping curve are encoded in an encoding format of the encoded data of the second image.

Figure 8:
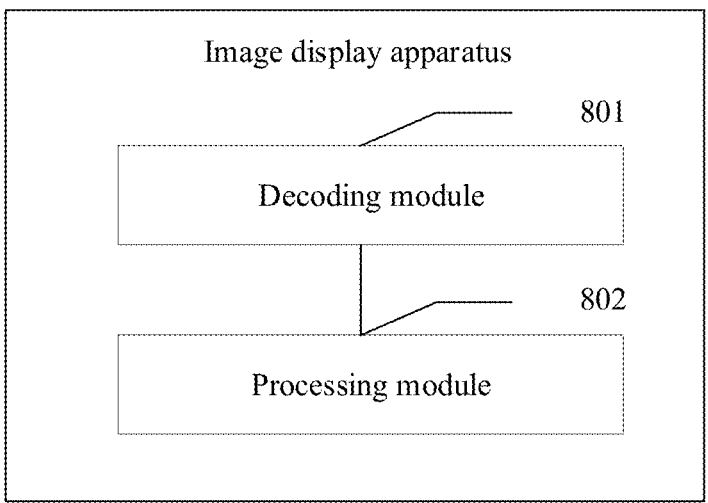
FIG. 8 is a diagram of an image display apparatus according to an embodiment of this application.

An embodiment of this application further provides an image display apparatus, applied to a display end device, as shown in FIG. 8. The apparatus includes:

a decoding module 801, configured to: receive transmission data of a second image, where the transmission data of the second image includes encoded data of the second image and first luminance related data, the first luminance related data is used to represent a luminance mapping relationship between the second image and a first image, a quantity of bits of the first image is greater than a quantity of bits of the second image, and the second image is an image obtained by compressing the first image; and determine a first tone mapping curve; and a processing module 802, configured to: perform tone mapping on the second image based on the first tone mapping curve to obtain a third image; and adjust a pixel value of a pixel of the third image based on the luminance related data to obtain a to-be-displayed image.

In a possible design, the transmission data further includes at least one tone mapping curve, and the at least one tone mapping curve is determined based on screen backlight information of a capture end device, the second image, and at least one specified screen display parameter.

The decoding module 801 is configured to determine the first tone mapping curve from the at least one tone mapping curve based on a screen display parameter of the display end device, where the screen display parameter of the display end device matches a specified screen display parameter corresponding to the first tone mapping curve.

In a possible design, the processing module 802 is configured to: determine before-adjustment screen backlight of the display end device and determine after-adjustment screen backlight of the display end device; adjust the pixel value of the pixel of the third image based on the before-adjustment screen backlight of the display end device and the after-adjustment screen backlight of the display end device to obtain a fourth image; and perform weighted fusion on the fourth image and the third image to obtain a to-be-displayed image, where a weight of the pixel of the third image and a weight of a pixel of the fourth image are determined based on the first luminance related data.

In a possible design, a pixel value of each pixel of the fourth image meets the following condition:

$$\text{pixel } 1_i = pow(BL0/BL1,\ 1/\text{gamma}) * \text{pixel } 0_i$$

$\text{pixel}1_i$ indicates a pixel value of an $i^{th}$ pixel of the fourth image, $\text{pixel}0_i$ indicates a pixel value of an $i^{th}$ pixel of the third image, BL0 indicates the before-adjustment screen backlight of the display end device, BL1 indicates the after-adjustment screen backlight of the display end device, gamma indicates a gamma value of the display end device, and pow(xExp, nExp) indicates the nExp$^{th}$ power of the base number xExp.

In a possible design, a pixel value of each pixel of the to-be-displayed image meets the following conditions:

$$\text{weight}_i = hdrlayer_i/2^N, \text{ and}$$

$$\text{pixel}_i = \text{pixel } 0_i * \text{weight}_i + \text{pixel } 1_i * (1 - \text{weight}_i)$$

N indicates a quantity of bits of the second image, $hdrlayer_i$ indicates first luminance related data corresponding to an $i^{th}$ pixel, $\text{pixel}1_i$ indicates a pixel value of an $i^{th}$ pixel of the fourth image, $\text{pixel}0_i$ indicates a pixel value of an $i^{th}$ pixel of the third image, and $\text{pixel}_¿$ indicates the pixel value of each pixel of the to-be-displayed image.

In a possible design, the processing module is further configured to adjust screen backlight of the display end device.

In a possible design, the after-adjustment screen backlight of the display end device meets the following condition:

$$BL1 = BL0 * (k1 * AVG(hdrlayer_i) + b1), \text{ or}$$

$$BL1 = BL0 * (k2 * \max(hdrlayer_i) + b2)$$

BL1 indicates after-adjustment screen backlight of the display end device, BL0 indicates before-adjustment screen backlight of the display end device, $hdrlayer_i$ indicates luminance increase data corresponding to an $i^{th}$ pixel of a display of the display end device, $AVG(hdrlayer_i)$ indicates an average value of luminance increase data corresponding to pixels included in the display of the display end device, $\max(hdrlayer_i)$ indicates a maximum value of the luminance increase data corresponding to the pixels included in the display of the display end device, k1 and k2 are both positive numbers, and b1 and b2 are both positive numbers less than 1.

FIG. 9 is a diagram of a structure of an encoding apparatus according to an embodiment of this application. The encoding apparatus includes:

an encoding module 901, configured to encode image data of a second image and first luminance related data into a bitstream, where the bitstream includes a joint photographic experts group (JPEG) file, the JPEG file carries the image data of the second image and the first luminance related data, the image data of the second image is obtained by compressing image data of a first image, a quantity of bits of the first image is greater than a quantity of bits of the second image, and the first luminance related data is used to represent a luminance mapping relationship between the first image and the second image; and a sending module 902, configured to send the bitstream.

In a possible implementation, the JPEG file includes a first JPEG image frame, the first JPEG image frame carries the image data of the second image, and the first luminance related data is carried in an application identifier APP field of the first JPEG image frame.

In a possible implementation, the first luminance related data is carried in the APP field of the first JPEG image frame in a form of metadata.

In a possible implementation, the APP field of the first JPEG image frame further includes a data type identifier, and when a value of the data type identifier is a first value, it indicates that a data type of the first luminance related data is a metadata type.

In a possible implementation, the encoding module 901 is further configured to:

encode at least one tone mapping curve into the APP field of the first JPEG image frame.

In a possible implementation, the JPEG file includes a first JPEG image frame and a second JPEG image frame, the first JPEG image frame carries encoded data of the second image, and the second JPEG image frame carries the first luminance related data.

In a possible implementation, an APP field of the first JPEG image frame includes a first location identifier, and the first location identifier indicates a start location of the second JPEG image frame in the JPEG file.

In a possible implementation, the APP field of the first JPEG image frame and an APP field of the second JPEG image frame each include a file type identifier, when a value of the file type identifier of the first JPEG image frame is a third value, it indicates that the APP field of the first JPEG image frame carries the encoded data of the second image, and when a value of the file type identifier of the second JPEG image frame is a fourth value, it indicates that the APP field of the second JPEG image frame carries the first luminance related data.

In a possible implementation, the APP field of the second JPEG image frame includes a data type identifier, and when a value of the data type identifier is a second value, it indicates that a data type of the first luminance related data is an image frame type.

In a possible implementation, the encoding module 901 is further configured to:

encode at least one tone mapping curve into the APP field of the second JPEG image frame.

In a possible implementation, the at least one tone mapping curve is determined based on a screen backlight parameter of a capture end device, the image data of the second image, and at least one specified screen backlight parameter, and the at least one specified screen backlight parameter is different from the screen backlight parameter of the capture end device.

In a possible implementation, the encoding module 901 is further configured to:

encode scaled display data into the APP field of the first JPEG image frame.

The scaled display data includes at least one of the following: scaling enhancement data, high-frequency texture enhancement data, or a tone mapping curve for scaled display, the scaling enhancement data includes information for describing an increased pixel value of a scale-up image of the first image compared with the first image or information for describing a reduced pixel value of a scale-down image of the first image compared with the first image, and the high-frequency texture enhancement data includes information for describing increased high-frequency texture of the scale-up image of the first image compared with the first image and/or information for describing reduced high-frequency texture of the scale-down image of the first image compared with the first image.

In a possible implementation, the JPEG file further includes a third JPEG image frame. The encoding module is further configured to:

encode the scaled display data into the JPEG file, where the scaled display data includes at least one of the following: scaling enhancement data, high-frequency texture enhancement data, or a tone mapping curve for scaled display, the scaling enhancement data includes information for describing an increased pixel value of a scale-up image of the first image compared with the first image or information for describing a reduced pixel value of a scale-down image of the first image compared with the first image, and the high-frequency texture enhancement data includes information for describing increased high-frequency texture of the scale-up image of the first image compared with the first image and/or information for describing reduced high-frequency texture of the scale-down image of the first image compared with the first image.

When the scaled display data includes the tone mapping curve for scaled display, the tone mapping curve for scaled display is encoded into the APP field of the first JPEG image frame;

when the scaled display data includes the scaling enhancement data, the JPEG file further includes the third JPEG image frame, and the third JPEG image frame carries the scaling enhancement data; or
    when the scaled display data includes the high-frequency texture enhancement data, the JPEG file further includes a fourth JPEG image frame, and the fourth JPEG image frame carries the high-frequency texture enhancement data.

In a possible implementation, the APP field of the first JPEG image frame further includes a second location identifier and/or a third location identifier, the second location identifier indicates a start location of the third JPEG image frame in the JPEG file, and the third location identifier indicates a start location of the fourth JPEG image frame in the JPEG file.

In a possible implementation, the APP field of the first JPEG image frame further includes a scaling enhancement manner identifier.

When the scaling enhancement manner identifier is a fifth value, it indicates that the scaling enhancement manner is superimposing the scaling enhancement data on an image obtained by enhancing the second image based on the first luminance related data; when the scaling enhancement manner identifier is a sixth value, it indicates that the scaling enhancement manner is weighted superimposing the high-frequency texture enhancement data on an image obtained by enhancing the second image based on the first luminance related data; or when the scaling enhancement manner identifier is a seventh value, it indicates that the scaling enhancement manner is adjusting, based on the tone mapping curve for scaled display, luminance of an image obtained by enhancing the second image based on the first luminance related data.

FIG. 10 is a diagram of a structure of a decoding apparatus according to an embodiment of this application.

A receiving module 1001 is configured to receive a bitstream, where the bitstream includes a joint photographic experts group (JPEG) file encoded in a JPEG format.

A decoding module 1002 is configured to decode the JPEG file to obtain image data of a second image and first luminance related data.

The image data of the second image is obtained by compressing image data of a first image, a quantity of bits of the first image is greater than a quantity of bits of the second image, and the first luminance related data is used to represent a luminance mapping relationship between the first image and the second image.

In a possible implementation, the decoding apparatus further includes:

a processing module (not shown in FIG. 10), configured to perform enhancement on the image data of the second image based on the first luminance related data to obtain a to-be-displayed image.

In a possible design, the JPEG file includes a first JPEG image frame, the first JPEG image frame carries the image data of the second image, and the first luminance related data is carried in an application identifier APP field of the first JPEG image frame.

The decoding module 1002 is configured to decode the first JPEG image frame to obtain the image data of the second image, and obtain the first luminance related data from the APP field of the first JPEG image frame.

In a possible design, the first luminance related data is carried in the APP field of the first JPEG image frame in a form of metadata.

In a possible design, the decoding module 1002 is further configured to decode the application identifier APP field of the first JPEG image frame to obtain at least one tone mapping curve.

In a possible design, the processing module is configured to: determine a first tone mapping curve from the at least one tone mapping curve based on a screen display parameter of a display end device, where the screen display parameter of the display end device matches a specified screen display parameter corresponding to the first tone mapping curve; perform tone mapping on the second image based on the first tone mapping curve to obtain a third image; and adjust a pixel value of a pixel of the third image based on the first luminance related data to obtain the to-be-displayed image.

In a possible design, the JPEG file includes a first JPEG image frame and a second JPEG image frame, the first JPEG image frame carries the image data of the second image, and the second JPEG image frame carries the first luminance related data.

The decoding module 1002 is configured to decode the first JPEG image frame to obtain the image data of the second image, and decode the second JPEG image frame to obtain the first luminance related data.

In a possible design, the decoding module 1002 is further configured to decode the application identifier APP field of the first JPEG image frame or the APP field of the second JPEG image frame to obtain at least one tone mapping curve.

In a possible design, the processing module is configured to: determine a first tone mapping curve from the at least one tone mapping curve based on a screen display parameter of a display end device, where the screen display parameter of the display end device matches a specified screen display parameter corresponding to the first tone mapping curve; perform tone mapping on the second image based on the first tone mapping curve to obtain a third image; and adjust a pixel value of a pixel of the third image based on the first luminance related data to obtain the to-be-displayed image.

In a possible design, the JPEG file further includes scaled display data through encoding, and the decoding module 1002 is further configured to decode the JPEG file to obtain the scaled display data.

The scaled display data includes at least one of the following: scaling enhancement data, high-frequency texture enhancement data, or a tone mapping curve for scaled display, the scaling enhancement data includes information for describing an increased pixel value of a scale-up image of the first image compared with the first image or information for describing a reduced pixel value of a scale-down image of the first image compared with the first image, and the high-frequency texture enhancement data includes information for describing increased high-frequency texture of the scale-up image of the first image compared with the first image and/or information for describing reduced high-frequency texture of the scale-down image of the first image compared with the first image.

The processing module is configured to: in response to a scale-up or scale-down operation performed by a user on the to-be-displayed image, perform enhancement on the to-be-displayed image based on the scaled display data to obtain an enhanced to-be-displayed image.

In a possible design, the scaled display data is carried in the APP field of the first JPEG image frame, and the decoding module is further configured to decode the APP field of the first JPEG image frame to obtain the scaled display data.

In a possible design, when the scaled display data includes the tone mapping curve for scaled display, the tone mapping curve for scaled display is encoded into the APP field of the first JPEG image frame, and the decoding module 1002 is configured to decode the APP field of the first JPEG image frame to obtain the tone mapping curve for scaled display; or when the scaled display data includes the scaling enhancement data, the JPEG file further includes a third JPEG image frame, the third JPEG image frame carries the scaling enhancement data, and the decoding module 1002 is configured to decode the third JPEG image frame to obtain the scaling enhancement data; or when the scaled display data includes the high-frequency texture enhancement data, the JPEG file further includes a fourth JPEG image frame, the fourth JPEG image frame carries the high-frequency texture enhancement data, and the decoding module 1002 is configured to decode the fourth JPEG image frame to obtain the high-frequency texture enhancement data.

In a possible design, the APP field of the first JPEG image frame further includes a second location identifier and/or a third location identifier, the second location identifier indicates a start location of the third JPEG image frame in the JPEG file, and the third location identifier indicates a start location of the fourth JPEG image frame in the JPEG file.

The decoding module 1002 is configured to:

determine the start location of the third JPEG image frame from the JPEG file based on the second location identifier, and decode the third JPEG image frame to obtain the scaling enhancement data based on the start location; or the decoding module 1002 is configured to determine the start location of the fourth JPEG image frame from the JPEG file based on the third location identifier, and decode the fourth JPEG image frame to obtain the scaling enhancement data based on the start location.

In a possible design, the APP field of the first JPEG image frame further includes a scaling enhancement manner identifier; and when the scaling enhancement manner identifier is a fifth value, it indicates that a scaling enhancement manner is superimposing the scaling enhancement data; when the scaling enhancement manner identifier is a sixth value, it indicates that a scaling enhancement manner is weighted superimposing the high-frequency texture enhancement data; or when the scaling enhancement manner identifier is a seventh value, it indicates that a scaling enhancement manner is adjusting, based on the tone mapping curve for scaled display, luminance of an image obtained by enhancing the second image based on the first luminance related data.

An embodiment of this application further provides a capture end device. As shown in FIG. 11, the capture end device 1100 may include a communication interface 1110 and a processor 1120. Optionally, the capture end device 1100 may further include a memory 1130. The memory 1130 may be disposed inside the capture end device, or may be disposed outside the capture end device. Both the capture module 701 and the processing module 702 shown in FIG. 7 may be implemented by the processor 1120. In some embodiments, a function of the encoding module 901 in the encoding apparatus shown in FIG. 9 may be implemented by the processor 1120, and a function of the sending module 902 may be implemented by the communication interface 1110.

In some embodiments, the capture end device 1100 further includes an image sensor 1140, configured to capture an image. In some embodiments, the capture end device 1100 further includes a display 1150. Certainly, the display 1150 may alternatively be disposed outside the capture end device 1100.

In a possible implementation, the processor 1120 is configured to implement any method performed by the capture end in FIG. 2 to FIG. 6, and output the transmission data through the communication interface 1110.

In an implementation process, each step of the processing procedure may be completed by using an integrated logic circuit of hardware in the processor 1120 or instructions in a form of software, to perform the method performed by the capture end (or the encoding apparatus) in FIG. 2 to FIG. 6. For brevity, details are not described herein again. Program code used by the processor 1120 to implement the foregoing method may be stored in the memory 1130. The memory 1130 is coupled to the processor 1120.

Any communication interface in embodiments of this application may be a circuit, a bus, a transceiver, or another apparatus that may be configured to exchange information, for example, the communication interface 1110 in the capture end device 1100. For example, the another apparatus may be a device connected to the capture end device 1100. For example, the another apparatus may be the display end device or the like.

The processor 1120 may cooperate with the memory 1130. The memory 1130 may be a nonvolatile memory, for example, a hard disk drive (HDD) or a solid-state drive (SSD), or may be a volatile memory, for example, a random access memory (RAM). The memory 1130 is any other medium that can be configured to carry or store desired program code in a form of instructions or a data structure and that can be accessed by a computer, but is not limited thereto.

A specific connection medium between the communication interface 1110, the processor 1120, and the memory 1130 is not limited in this embodiment of this application. In this embodiment of this application, the memory 1130, the processor 1120, and the communication interface 1110 are connected to each other through a bus in FIG. 11. The bus is represented by using a bold line in FIG. 11. A connection manner between other components is merely an example for description, and is not limited thereto. The bus may be classified into an address bus, a data bus, a control bus, and the like. For ease of representation, only one bold line is used to represent the bus in FIG. 11, but this does not mean that there is only one bus or only one type of bus.

An embodiment of this application further provides a display end device. As shown in FIG. 12, the display end device 1200 may include a communication interface 1210 and a processor 1220. Optionally, the display end device 1200 may further include a memory 1230. The memory 1230 may be disposed inside the display end device, or may be disposed outside the display end device. Both the decoding module 801 and the processing module 802 shown in FIG. 8 may be implemented by the processor 1220. In some embodiments, the display end device may further include a display 1240, configured to display a to-be-displayed image. In some embodiments, a function of the receiving module 1001 in the decoding apparatus shown in FIG. 10 may be implemented by the communication interface 1210, and a function of the decoding module 1002 may be implemented by the processor 1220.

In a possible implementation, the processor 1220 is configured to obtain transmission data through the communication interface 1210, and implement any method performed by the display end device (or the decoding apparatus) in FIG. 2 to FIG. 6.

In an implementation process, each step of the processing procedure may be completed by using an integrated logic circuit of hardware in the processor 1220 or instructions in a form of software, to perform the method performed by the display end in FIG. 2 to FIG. 6. For brevity, details are not described herein again. Program code used by the processor 1220 to implement the foregoing method may be stored in the memory 1230. The memory 1230 is coupled to the processor 1220.

Any communication interface in embodiments of this application may be a circuit, a bus, a transceiver, or another apparatus that may be configured to exchange information, for example, the communication interface 1210 in the display end device 1200. For example, the another apparatus may be a device connected to the display end device 1200. For example, the another apparatus may be the capture end device or the like.

The processor 1220 may cooperate with the memory 1230. The memory 1230 may be a nonvolatile memory, for example, a hard disk drive (HDD) or a solid-state drive (SSD), or may be a volatile memory, for example, a random access memory (RAM). The memory 1230 is any other medium that can be configured to carry or store desired program code in a form of instructions or a data structure and that can be accessed by a computer, but is not limited thereto.

A specific connection medium between the communication interface 1210, the processor 1220, and the memory 1230 is not limited in this embodiment of this application. In this embodiment of this application, the memory 1230, the processor 1220, and the communication interface 1210 are connected to each other through a bus in FIG. 12. The bus is represented by using a bold line in FIG. 12. A connection manner between other components is merely an example for description, and is not limited thereto. The bus may be classified into an address bus, a data bus, a control bus, and the like. For ease of representation, only one bold line is used to represent the bus in FIG. 12, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

The coupling in embodiments of this application is indirect coupling or a communication connection between apparatuses or modules for information exchange between the apparatuses or the modules, and may be in electrical, mechanical, or other forms.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement functions in any one or more of the foregoing embodiments, for example, configured to implement the method performed by the capture end in FIG. 2 to FIG. 6, or configured to implement the method performed by the display end device in FIG. 2 to FIG. 6. Optionally, the chip further includes a memory, and the memory is configured to store necessary program instructions and data to be executed by the processor. The chip may include a chip, or include a chip and another discrete device.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this application without departing from the scope of embodiments of this application. This application is intended to cover these modifications and variations provided that these modifications and variations in embodiments of this application fall within the scope of the claims and their equivalent technologies of this application.

What is claimed is:

1. An image capture method, applied to a capture end device, the method comprising:

capturing a first image to obtain image data of the first image;

performing compression on the first image based on the image data of the first image to obtain image data of a second image, wherein a quantity of bits of the first image is greater than a quantity of bits of the second image, wherein a quantity of bits of each image corresponds to a quantity of bits to represent each color component of the respective image;

obtaining first luminance related data based on the image data of the first image and the image data of the second image, wherein the first luminance related data is used to represent a luminance mapping relationship between the first image and the second image; and sending the transmission data of the second image, wherein the transmission data of the second image comprises encoded data of the second image, at least one tone mapping curve and the first luminance related data, wherein the at least one tone mapping curve is determined based on a screen backlight parameter of the capture end device, the image data of the second image, and at least one specified screen backlight parameter, wherein the at least one specified screen backlight parameter is different from the screen backlight parameter of the capture end device.

2. The method of claim 1, wherein obtaining the first luminance related data based on the image data of the first image and the image data of the second image comprises:

separately performing normalization on the image data of the first image and the image data of the second image based on the quantity of bits of the first image and the quantity of bits of the second image, to obtain normalized data of the first image and normalized data of the second image; and obtaining the first luminance related data based on the normalized data of the first image and the normalized data of the second image.

3. The method of claim 2, wherein the quantity of bits of the first image is N, the quantity of bits of the second image is M, a range of the normalized data of the first image is 0-X, a range of the normalized data of the second image is 0-Y, and $Y/X=2^{M-N}$.

4. The method of claim 2, wherein the obtaining the first luminance related data based on the normalized data of the first image and the normalized data of the second image comprises:

generating the first luminance related data based on ratios of normalized data of pixels in the first image to normalized data of the corresponding pixels in the second image.

5. The method of claim 2, wherein the obtaining the first luminance related data based on the normalized data of the first image and the normalized data of the second image comprises:

generating second luminance related data based on ratios of normalized data of pixels in the first image to normalized data of the corresponding pixels in the second image; and identifying a specified highlighted object comprised in the first image, and adjusting, based on an optical electro conversion curve, a luminance mapping relationship that is of a pixel corresponding to the highlighted object and that is in the second luminance related data to obtain the first luminance related data.

6. The method of claim 1, wherein the transmission data of the second image is comprised in a joint photographic experts group (JPEG) file encoded in a JPEG format, the JPEG file comprises a first JPEG image frame, the first JPEG image frame carries the encoded data of the second image, and the first luminance related data is carried in an application identifier field of the first JPEG image frame.

7. The method of claim 6, wherein the first luminance related data is carried in the application identifier field of the first JPEG image frame in a form of metadata.

8. The method of claim 6, wherein when the transmission data of the second image further comprises a tone mapping curve, the tone mapping curve is carried in the application identifier field of the first JPEG image frame.

9. The method of claim 1, wherein the transmission data of the second image is comprised in a joint photographic experts group (JPEG) file encoded in a JPEG format, the JPEG file comprises a first JPEG image frame and a second JPEG image frame, the first JPEG image frame carries the encoded data of the second image, and the second JPEG image frame carries the first luminance related data.

10. An image display method, applied to a display end device, the method comprising:

receiving transmission data of a second image, wherein the transmission data of the second image comprises encoded data of the second image, at least one tone mapping curve and first luminance related data, the first luminance related data is used to represent a luminance mapping relationship between the second image and a first image, a quantity of bits of the first image is greater than a quantity of bits of the second image, and the second image is an image obtained by compressing the first image, wherein a quantity of bits of each image corresponds to a quantity of bits to represent each color component of the respective image, wherein the at least one tone mapping curve is determined based on screen backlight information of a capture end device, the second image, and at least one specified screen display parameter;

determining a first tone mapping curve from the at least one tone mapping curve based on a screen display parameter of the display end device, wherein the screen display parameter of the display end device matches a specified screen display parameter corresponding to the first tone mapping curve;

performing tone mapping on the second image based on the first tone mapping curve to obtain a third image; and adjusting a pixel value of a pixel of the third image based on the first luminance related data to obtain a to-be-displayed image.

11. The method of claim 10, wherein the receiving transmission data of a second image comprises:

receiving a bitstream, wherein the bitstream comprises a joint photographic experts group (JPEG) file encoded in a JPEG format, the JPEG file comprises a first JPEG image frame, the first JPEG image frame carries the encoded data of the second image, and the first luminance related data is carried in an application identifier field of the first JPEG image frame; and decoding the first JPEG image frame to obtain the second image and decoding the application identifier field of the first JPEG image frame to obtain the first luminance related data.

12. The method of claim 11, wherein the application identifier field of the first JPEG image frame further comprises a data type identifier, when a value of the data type identifier is a first value, it indicates that a data type of the first luminance related data is a metadata type, and the decoding the application identifier field of the first JPEG image frame to obtain the first luminance related data comprises:

decoding the application identifier field of the first JPEG image frame to obtain the first luminance related data when the data type identifier obtained by decoding the application identifier field of the first JPEG image frame is the first value.

13. The method of claim 11, wherein the transmission data further comprises the at least one tone mapping curve, and the at least one tone mapping curve is carried in the application identifier field of the first JPEG image frame; and the method further comprises:

decoding the application identifier field of the first JPEG image frame to obtain the at least one tone mapping curve.

14. The method of claim 10, wherein the receiving transmission data of a second image comprises:

receiving a bitstream, wherein the bitstream comprises a joint photographic experts group (JPEG) file encoded in a JPEG format, and the JPEG file comprises a first JPEG image frame and a second JPEG image frame; and decoding the first JPEG image frame to obtain the second image and decoding the second JPEG image frame to obtain the first luminance related data.

15. The method of claim 14, wherein an application identifier field of the first JPEG image frame comprises a first location identifier, and the first location identifier indicates a start location of the second JPEG image frame in the JPEG file; and the decoding the first JPEG image frame to obtain the second image and decoding the second JPEG image frame to obtain the first luminance related data comprises:

decoding the first JPEG image frame to obtain the second image and obtaining the first location identifier; and determining the start location of the second JPEG image frame from the JPEG file based on the first location identifier, and decoding the second JPEG image frame to obtain the first luminance related data based on the start location.

16. The method of claim 15, wherein the application identifier field of the first JPEG image frame further comprises a data type identifier, when a value of the data type identifier is a second value, it indicates that a data type of the first luminance related data is an image frame type, and decoding the application identifier field of the first JPEG image frame to obtain the first luminance related data comprises:

decoding the second JPEG image frame to obtain the first luminance related data when the data type identifier obtained by decoding the application identifier field of the first JPEG image frame is the second value.

17. A capture end device, comprising:

a processor; and a non-transitory memory storing program code, the program code including instructions that, when executed by the processor, cause the capture end device to:

capture a first image to obtain image data of the first image;

perform compression on the first image based on the image data of the first image to obtain image data of a second image, wherein a quantity of bits of the first image is greater than a quantity of bits of the second image, wherein a quantity of bits of each image corresponds to a quantity of bits to represent each color component of the respective image;

obtain first luminance related data based on the image data of the first image and the image data of the second image, wherein the first luminance related data is used to represent a luminance mapping relationship between the first image and the second image; and send the transmission data of the second image, wherein the transmission data of the second image comprises encoded data of the second image, at least one tone mapping curve and the first luminance related data, wherein the at least one tone mapping curve is determined based on a screen backlight parameter of the capture end device, the image data of the second image, and at least one specified screen backlight parameter, wherein the at least one specified screen backlight parameter is different from the screen backlight parameter of the capture end device.

18. A display end device, comprising:

a processor; and a non-transitory memory storing program code, the program code including instructions that, when executed by the processor, cause the capture end device to:

receive transmission data of a second image, wherein the transmission data of the second image comprises encoded data of the second image, at least one tone mapping curve and first luminance related data, the first luminance related data is used to represent a luminance mapping relationship between the second image and a first image, a quantity of bits of the first image is greater than a quantity of bits of the second image, and the second image is an image obtained by compressing the first image, wherein a quantity of bits of each image corresponds to a quantity of bits to represent each color component of the respective image, wherein the at least one tone mapping curve is determined based on screen backlight information of a capture end device, the second image, and at least one specified screen display parameter;

determine a first tone mapping curve from the at least one tone mapping curve based on a screen display parameter of the display end device, wherein the screen display parameter of the display end device matches a specified screen display parameter corresponding to the first tone mapping curve;

perform tone mapping on the second image based on the first tone mapping curve to obtain a third image; and adjust a pixel value of a pixel of the third image based on the first luminance related data to obtain a to-be-displayed image.

\* \* \* \* \*